(12) United States Patent
Hung et al.

(10) Patent No.: US 8,301,667 B2
(45) Date of Patent: Oct. 30, 2012

(54) METHOD AND SYSTEM FOR IMPLEMENTING EFFICIENT CURSOR PRUNING

(75) Inventors: Hochak Hung, Belmont, CA (US); Kumar Rajamani, San Ramon, CA (US); Jaebock Lee, Sunnyvale, CA (US); Philip Yam, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 12/712,767

(22) Filed: Feb. 25, 2010

(65) Prior Publication Data

US 2011/0208757 A1    Aug. 25, 2011

(51) Int. Cl.
*G06F 17/30* (2006.01)
*G09G 5/00* (2006.01)
(52) U.S. Cl. ......... 707/803; 707/769; 707/786; 345/156
(58) Field of Classification Search ................... 707/803, 707/769, 786; 345/157, 160, 156
See application file for complete search history.

(56) References Cited

U.S. PATENT DOCUMENTS

| | | | |
|---|---|---|---|
| 6,892,205 B1 | 5/2005 | Colrain et al. | |
| 6,983,286 B1 | 1/2006 | Sinha et al. | |
| 6,985,904 B1 | 1/2006 | Kaluskar et al. | |
| 7,203,676 B2 | 4/2007 | Chen et al. | |
| 7,251,657 B2 | 7/2007 | Saha et al. | |
| 7,340,452 B2 | 3/2008 | Ghosh et al. | |
| 7,451,133 B2 | 11/2008 | Yoaz et al. | |
| 7,475,056 B2 | 1/2009 | Ghosh et al. | |
| 7,526,508 B2 | 4/2009 | Tan et al. | |
| 7,685,095 B2 | 3/2010 | Ghosh et al. | |
| 7,689,550 B2 * | 3/2010 | Lee et al. | 707/999.003 |
| 7,698,310 B2 * | 4/2010 | Basu et al. | 707/999.203 |
| 7,702,623 B2 | 4/2010 | Lee et al. | |
| 7,984,042 B2 | 7/2011 | Colrain et al. | |
| 8,086,645 B2 | 12/2011 | Ghosh et al. | |
| 2011/0208757 A1 | 8/2011 | Hung et al. | |
| 2011/0238655 A1 * | 9/2011 | Colrain et al. | 707/718 |

* cited by examiner

*Primary Examiner* — Cheryl Lewis
(74) *Attorney, Agent, or Firm* — Vista IP Law Group, LLP

(57) ABSTRACT

Disclosed are improved methods, systems, and media for cursor sharing and cursor pruning. According to some approaches, existing child cursors are distinguished using a cursor sharing criteria node structure. A sharing criteria node (also referred to as a "diagnostic" node) is created when a sharing criteria mismatch/failure happens. The node contains information about why the child cursor could not be shared and also information that can be used to quickly re-evaluate this sharing criterion in the future.

37 Claims, 36 Drawing Sheets

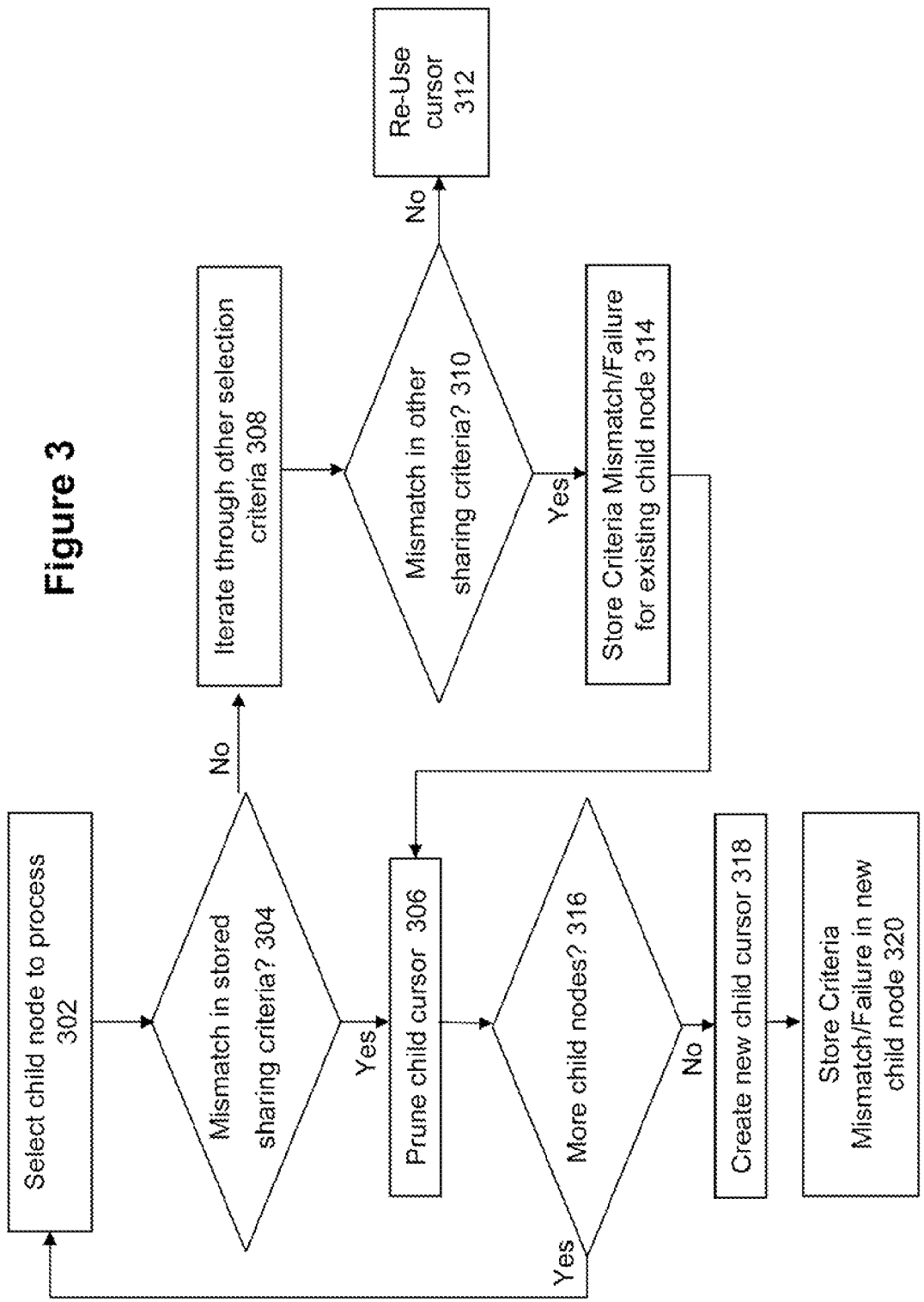

Figure 4A

| Sharing Criteria | User 1 | User 2 | User 3 |
|---|---|---|---|
| Language | English | Chinese | French |

Figure 4B

Select * from Foo_Table;

402

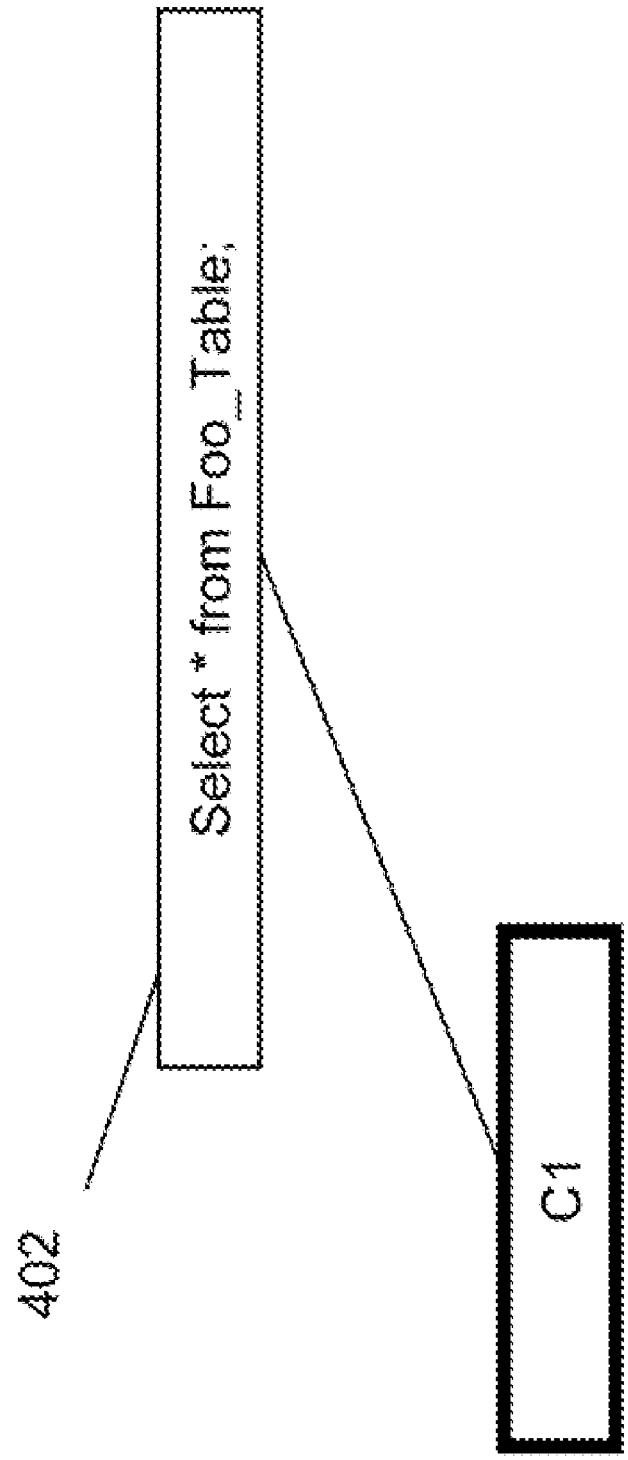

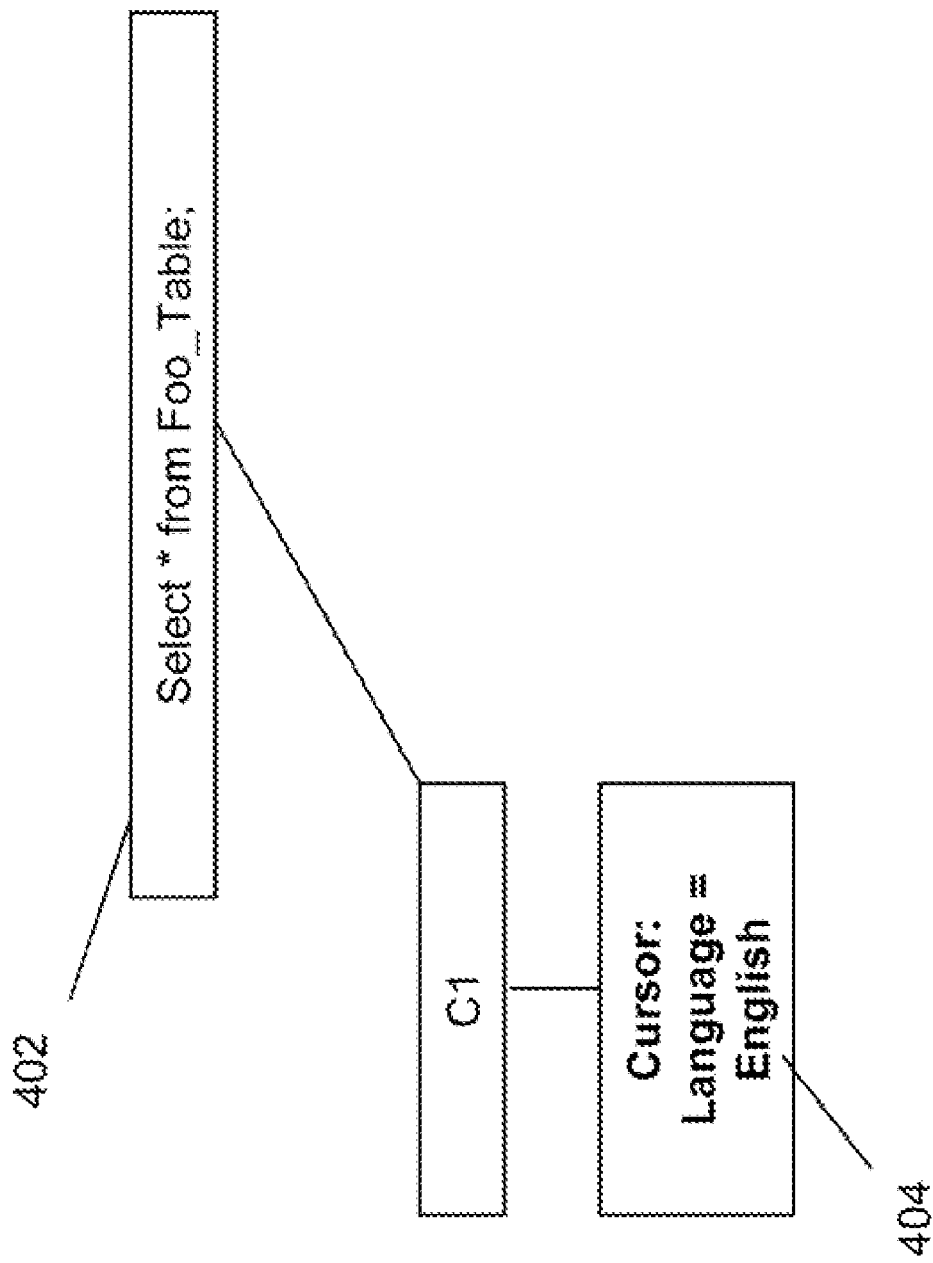

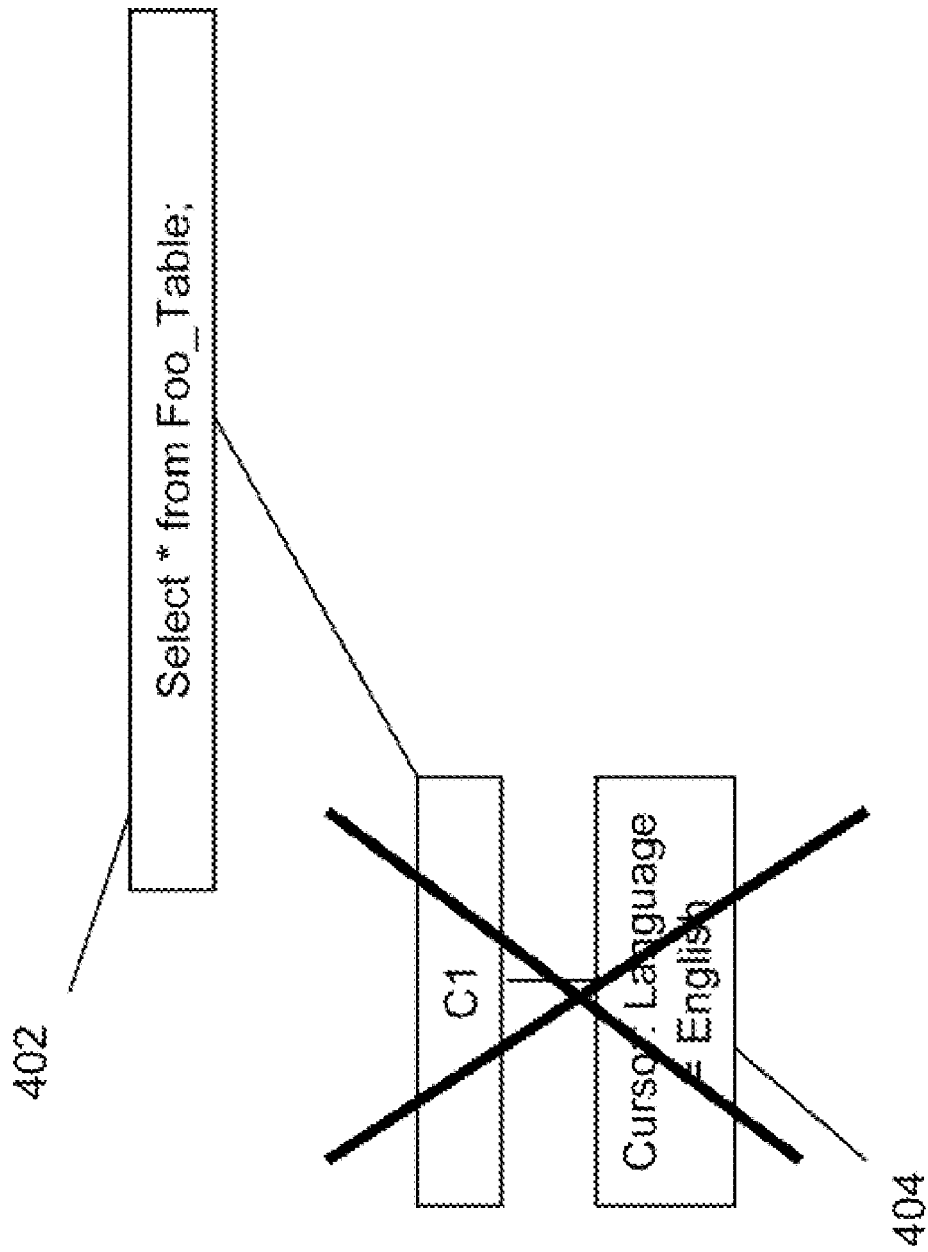

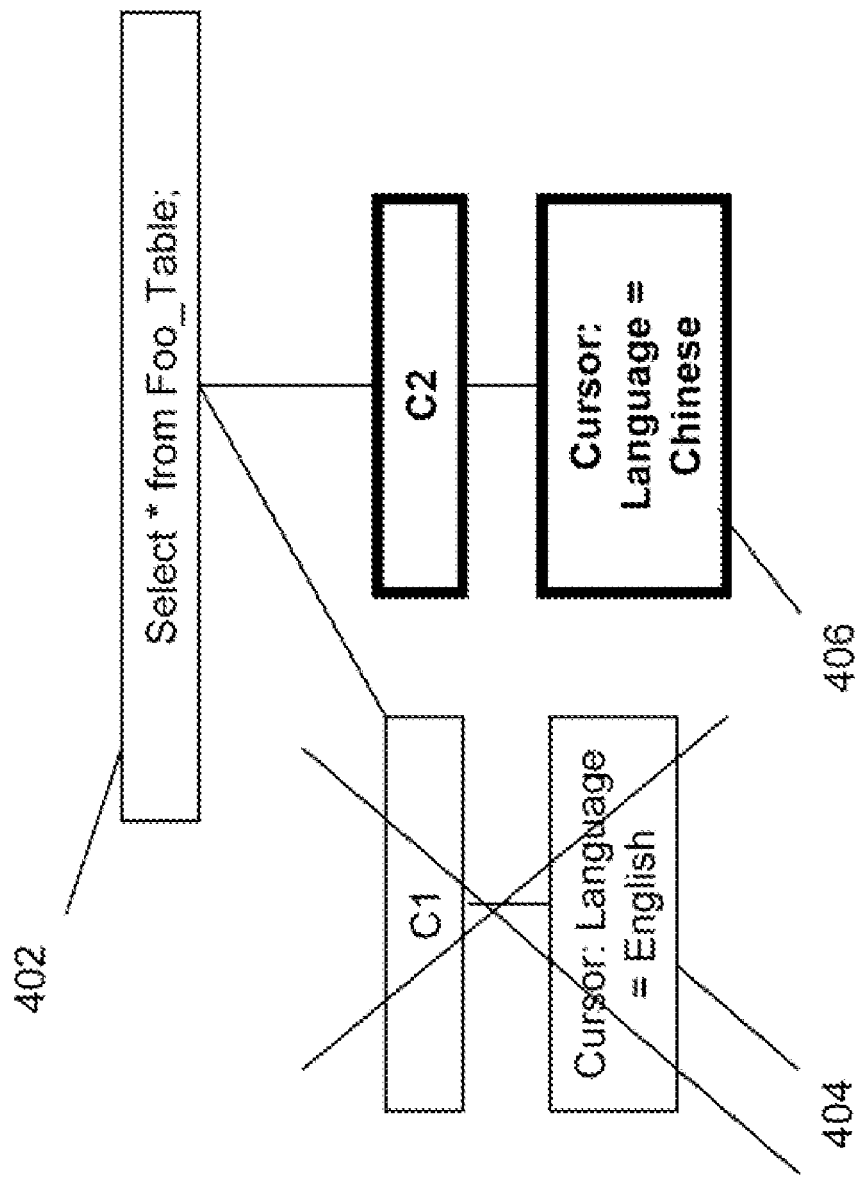

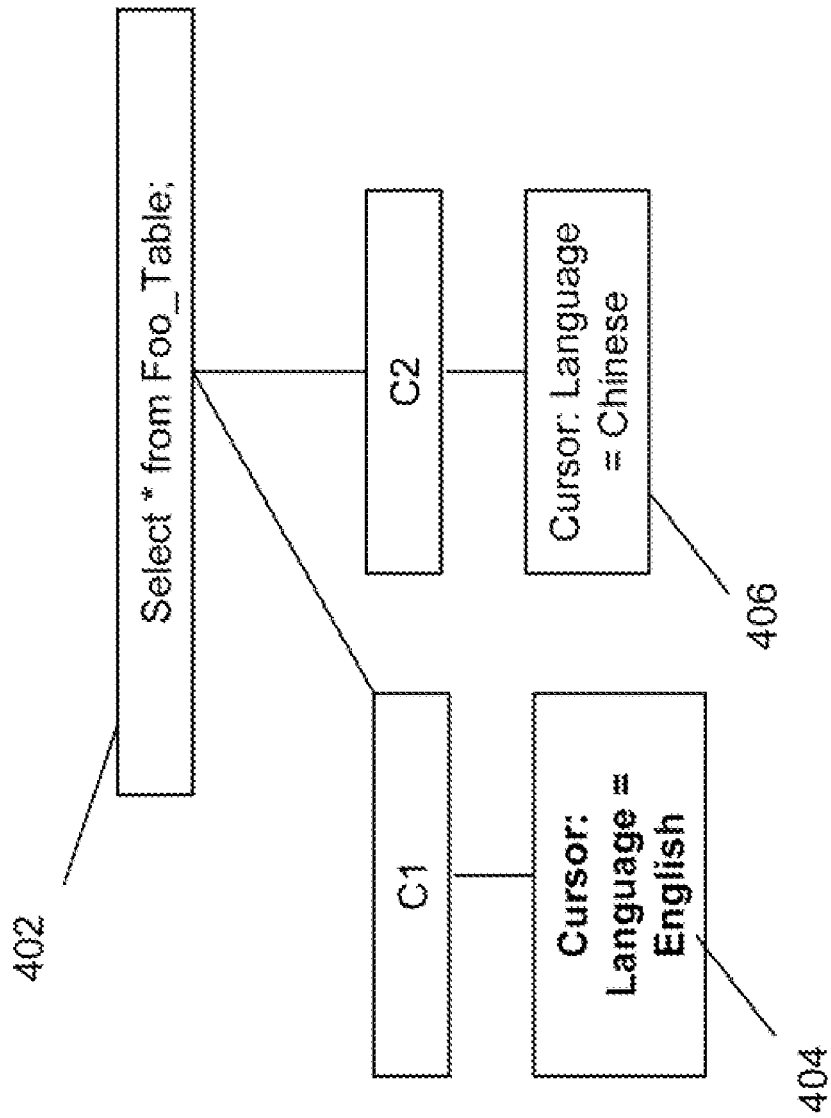

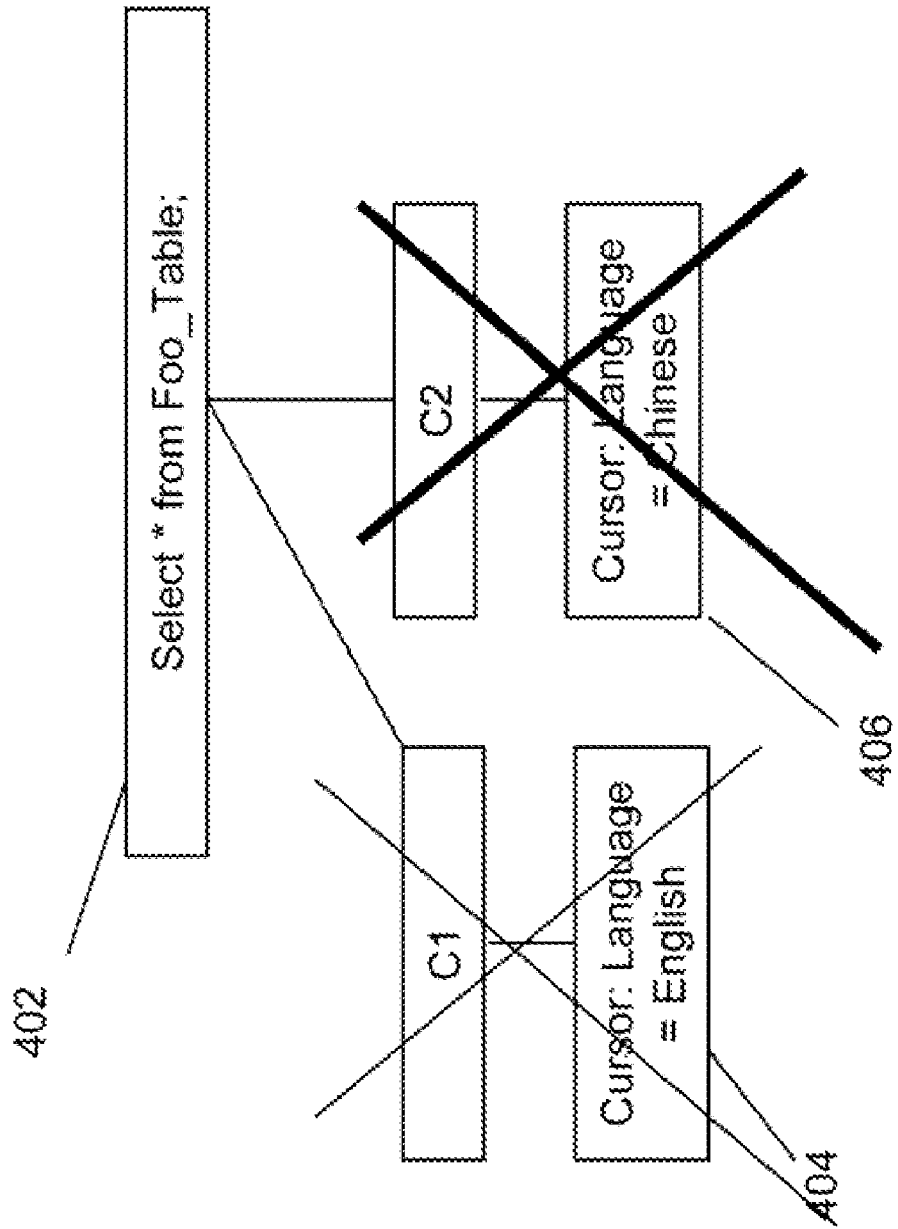

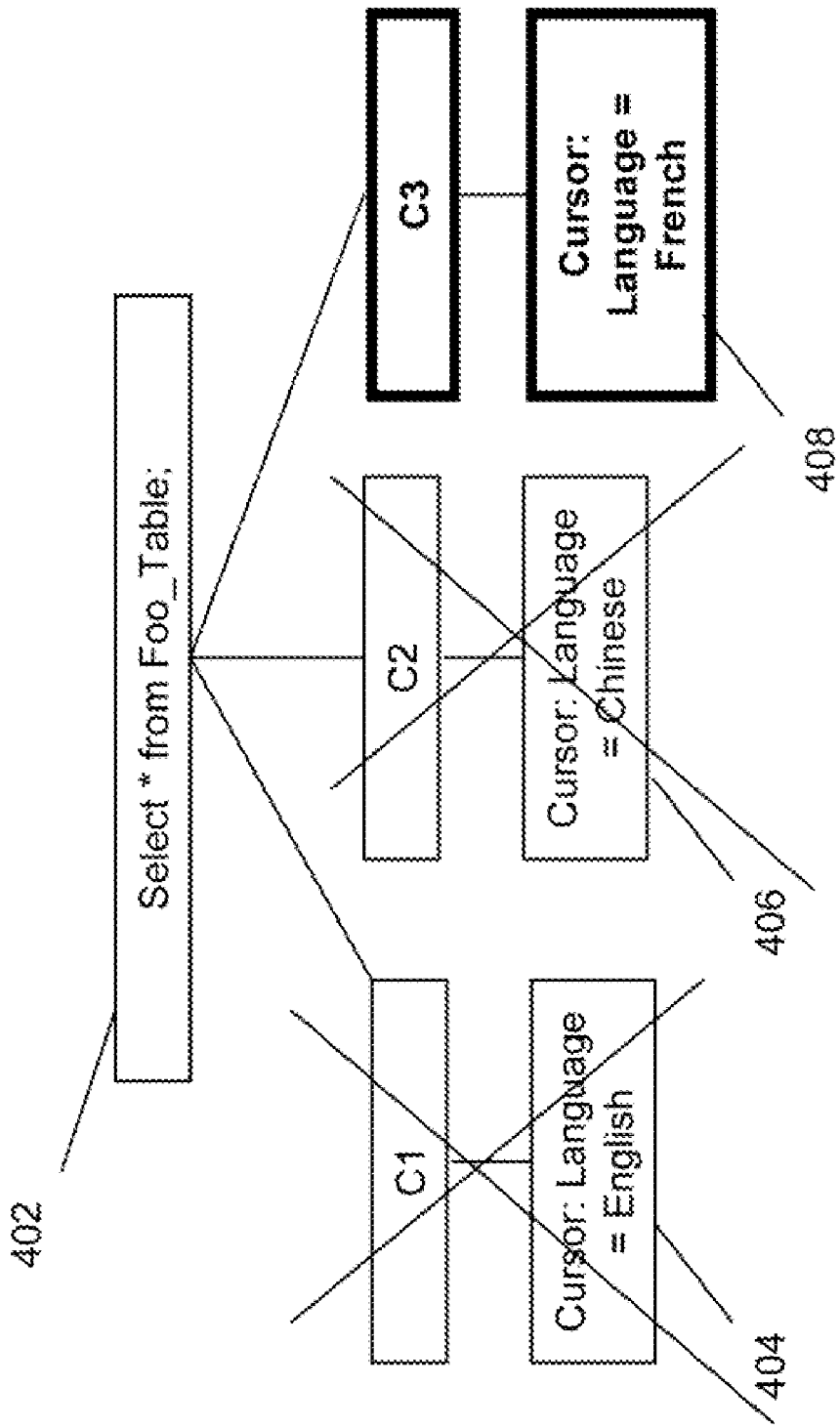

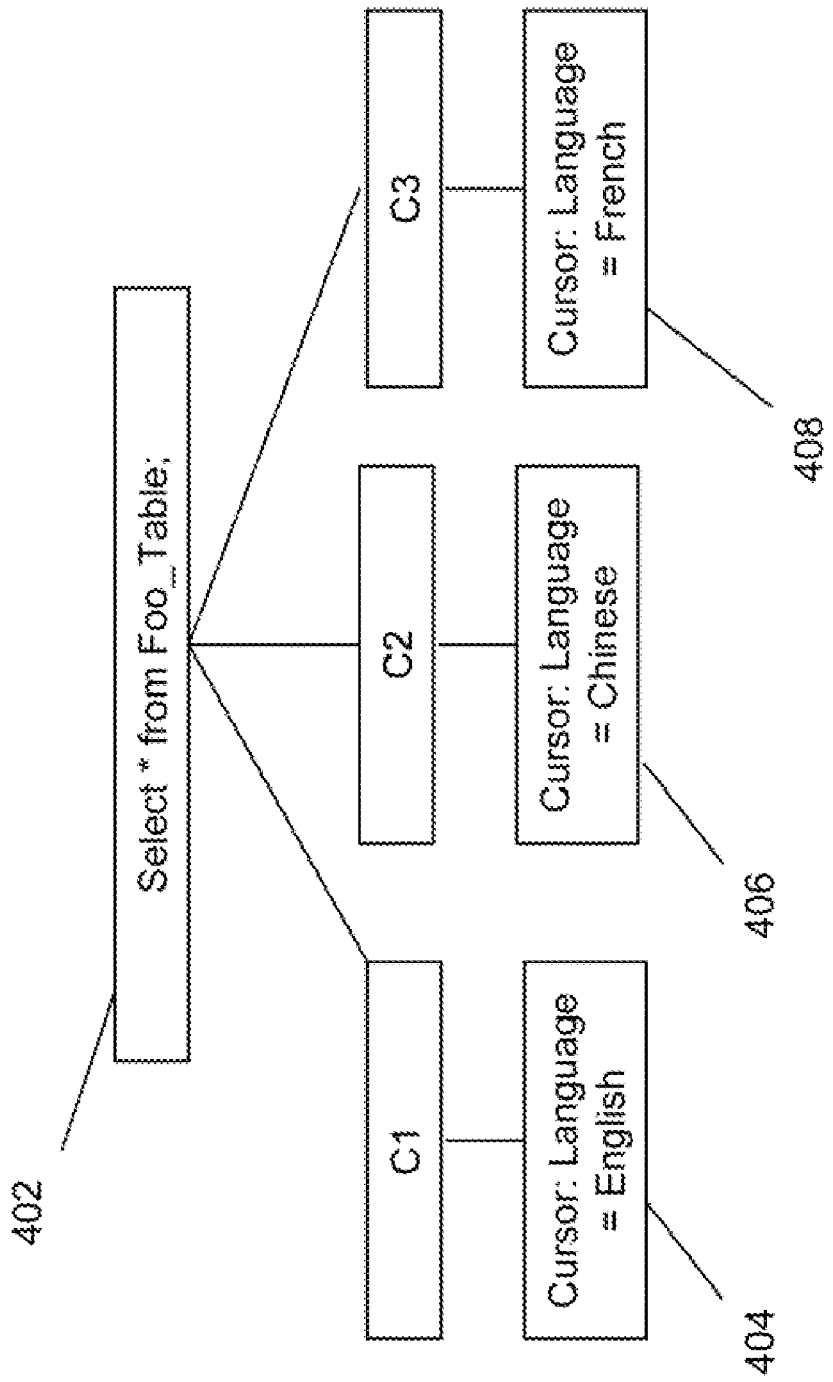

Figure 5A

| Sharing Criteria | User 1 | User 2 | User 3 | User 4 |
|---|---|---|---|---|
| Language | Chinese | English | Chinese | Chinese |
| Security Level | 1 | 2 | 2 | 2 |
| Table Resolution/ Mapping | T1= Michael.T1 | T1= Scott.T1 | Default | Default |
| Optimizer Setting | 4 | 5 | 4 | 3 |

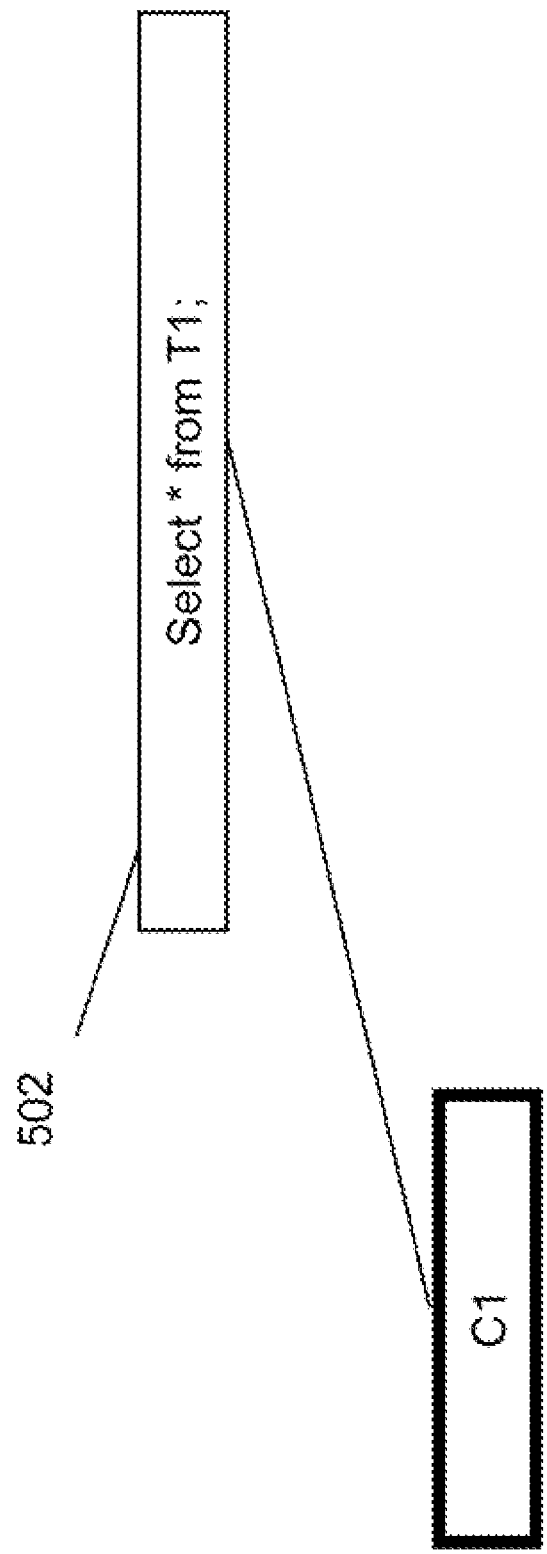

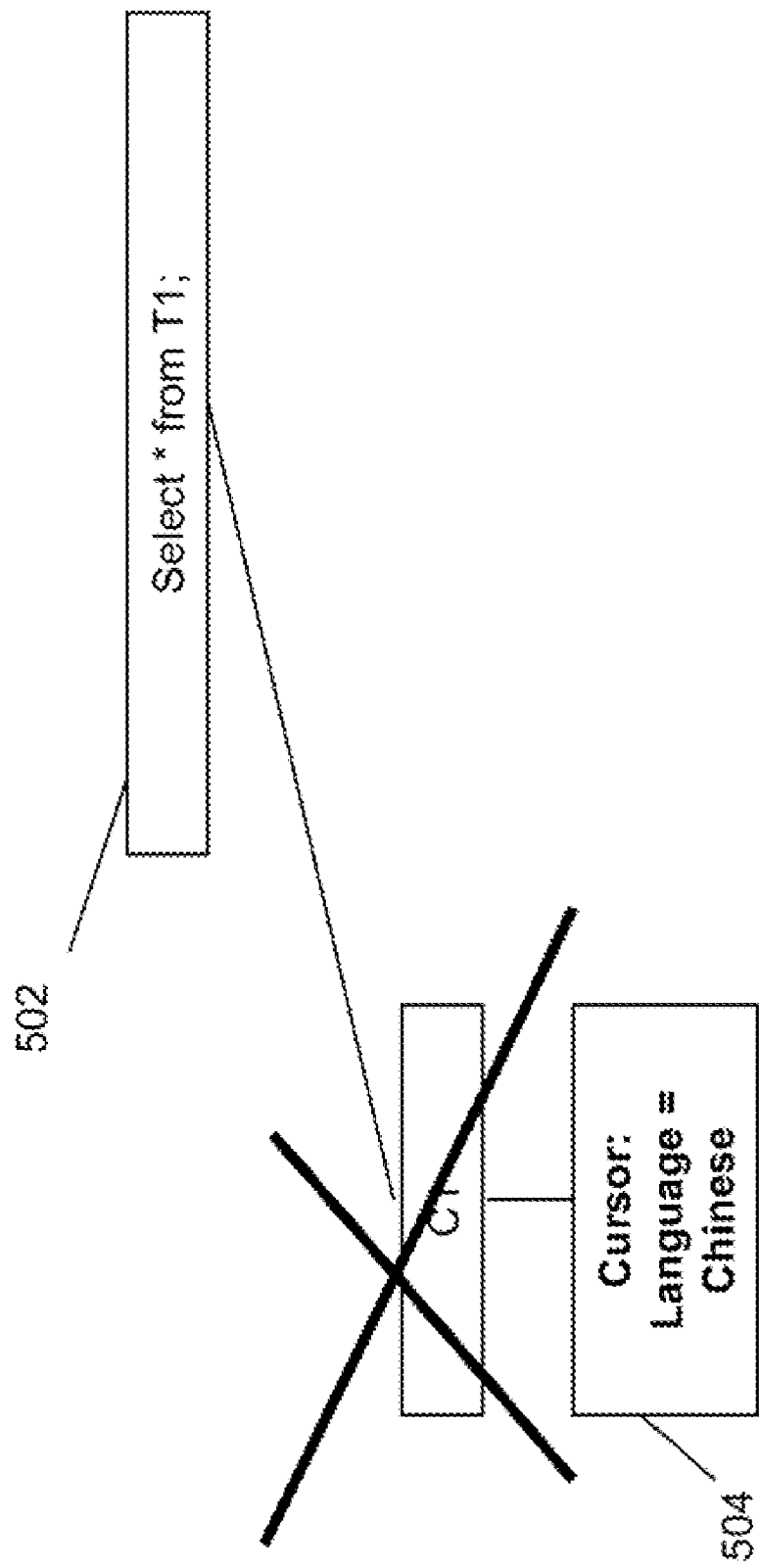

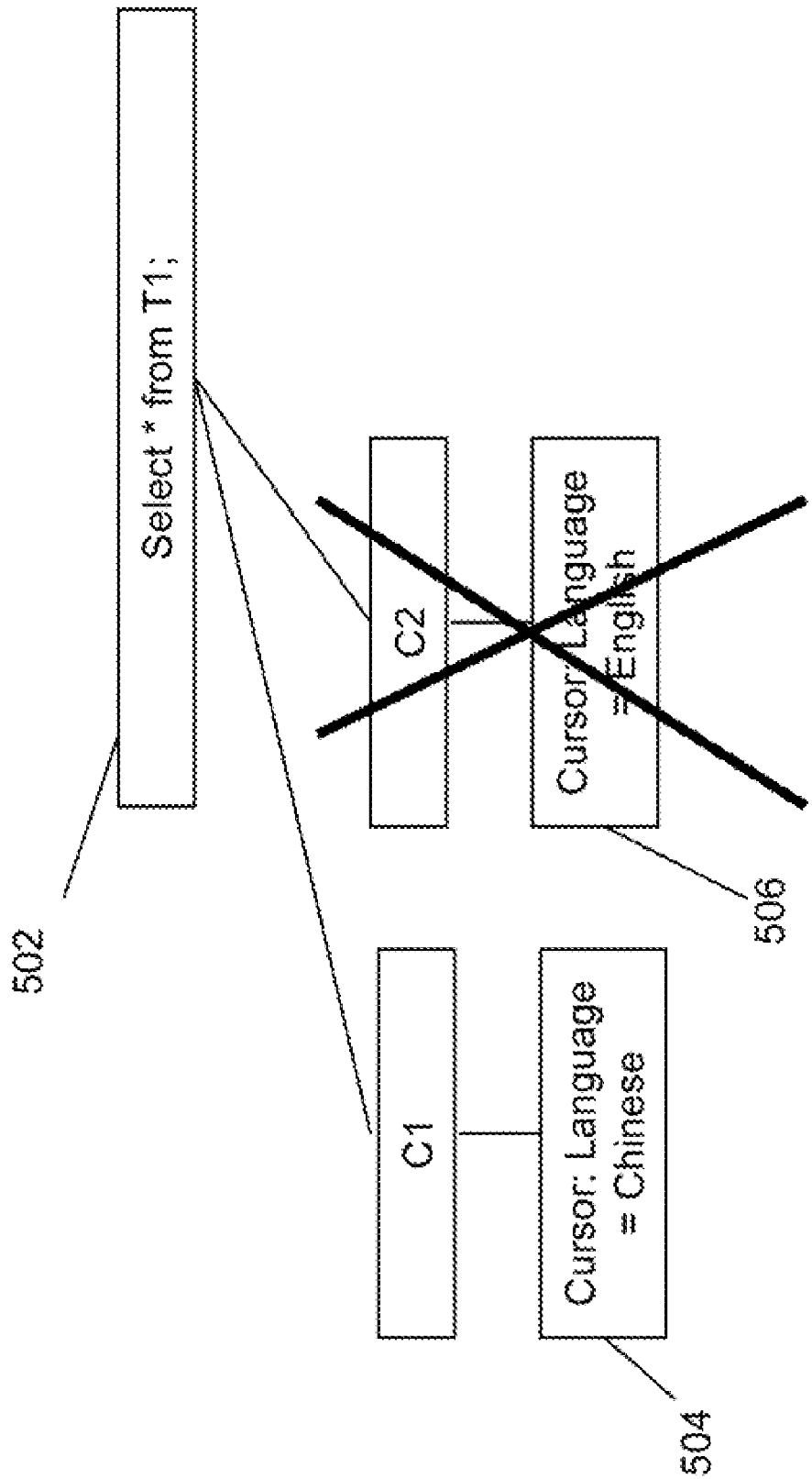

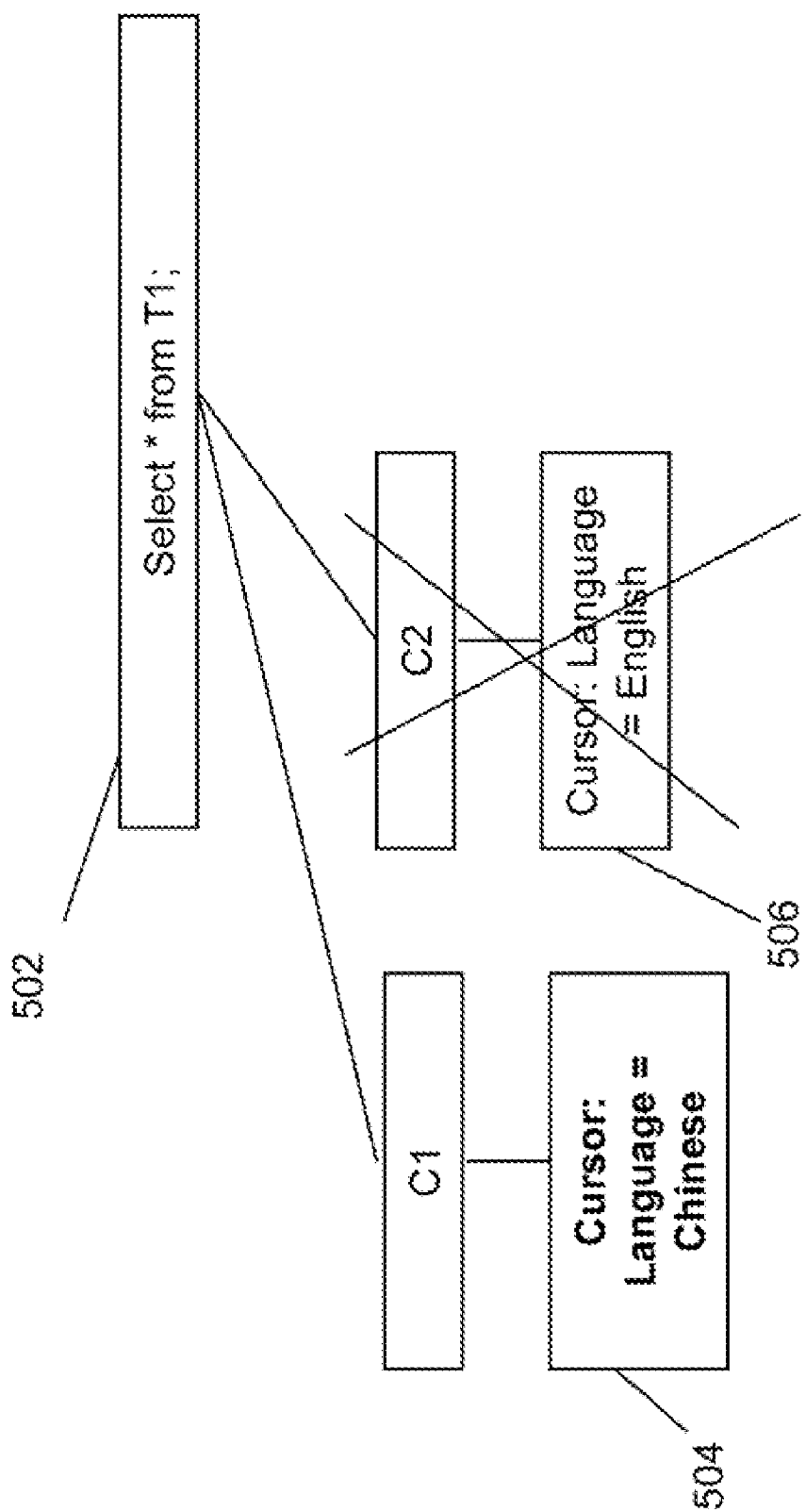

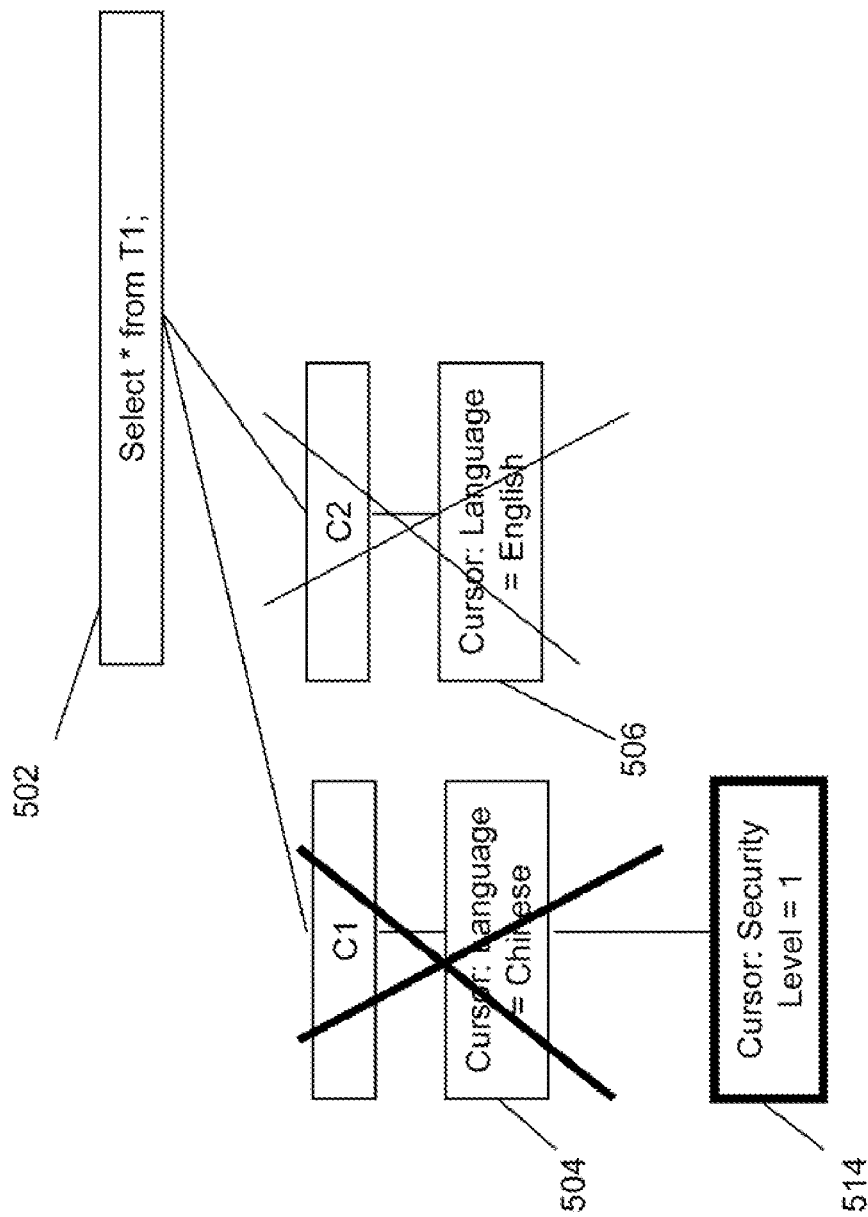

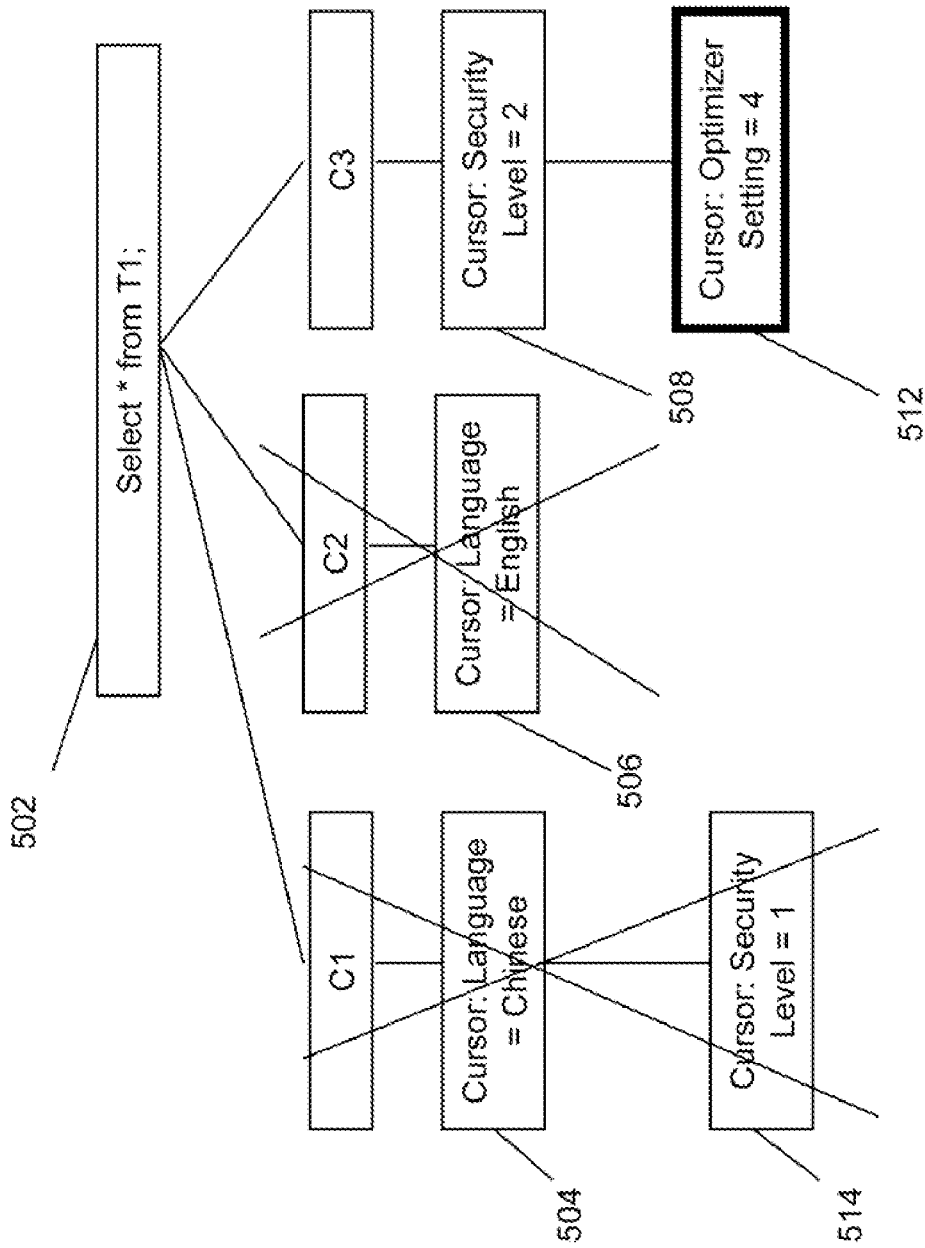

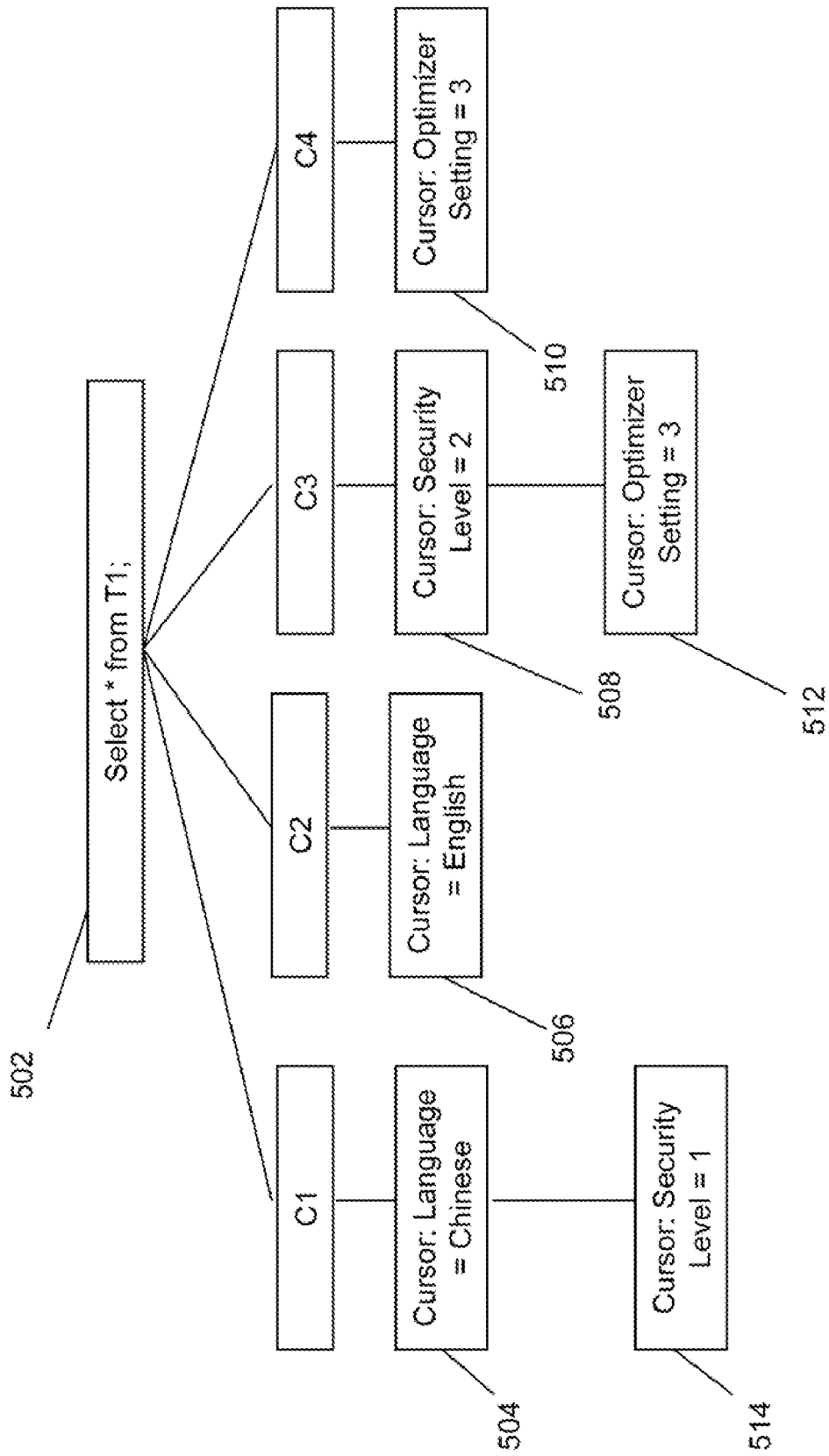

METHOD AND SYSTEM FOR IMPLEMENTING EFFICIENT CURSOR PRUNING

FIELD

The invention relates to the field of data management and query processing.

BACKGROUND AND SUMMARY

Many operations performed in a database system are executed using database query language statements, such as statements in the structured query language (SQL). SQL is a non-procedural language for accessing and manipulating data in a relational or object-relational database. Procedural languages, such as PL/SQL, may also be used to perform operations in a database system. For purpose of illustration, this document will be explained with reference to SQL statements and relational database structures such as tables and rows. It is noted, however, that the inventive concepts disclosed herein are applicable to other types of languages, objects, structures, and operations in a database.

A cursor is a handle to a query execution area corresponding to an area in memory in which a parsed SQL statement and/or other information for processing the SQL statement are stored. Cursors enable a SQL statement to retrieve rows from a database table into a given result set, which can then be accessed, displayed, or operated upon. To execute a SQL statement, the cursor is first created, either in conjunction with the SQL query or independently. The cursor may be automatically handled by the database system, or manually controlled by a programmer through an application programming interface. The SQL statement is thereafter parsed, optimized, and executed to produce a set of rows called the result set. The rows in the result set are retrieved ("fetched") either a row at a time or in groups. The cursor can be considered the database query and its result set.

A significant level of overhead and expense is normally required to create a cursor, particularly due to the sheer amount of work involved to perform a "hard" parse of the SQL statement and to generate an execution plan for that statement. The SQL compilation process involvers a parse phase, where the SQL statement is analyzed and parsed into its constituent components to create an expression/parse tree. An optimizer accepts the parsed and analyzed statement from the parse phase to determine an appropriate method to best execute the particular SQL statement based upon a number of criteria, including gathered statistical information, optimization methodologies, and/or selectivity analysis. The result is a memory resident data structure that dictates an execution plan for carrying out the database statement request.

Due to this expense, it is often inefficient to recreate a cursor each and every time a request is made to execute a particular SQL statement. Instead, the cursor can be cached and reused to execute the same SQL statement.

FIG. 1 shows a diagram of a parent-child cursor hierarchy according to some approaches for implementing a database system. The parent cursor 102 corresponds to a specific SQL query to be executed in the database system. The child cursors 1, 2, ... N are the different cursors that are created to execute the SQL query, where each child cursor corresponds to a unique set of criteria $P_1$-$P_M$ (referred to herein as "sharing criteria") that causes that child cursor to require a different execution plan from another child cursor.

As noted above, it is highly desirable to allow executing queries to share cursors, since there is a significant cost involved in creating new child cursors. The problem is that there is also a significant expense involved in searching existing child cursors to find the child cursor that has the exact same set of sharing criteria as the query currently being executed. In the example that is shown in FIG. 1, assume that there are N number of existing child cursors and M number of sharing criteria that may need to be checked to find the appropriate cursor that can be re-used for a current query execution.

In this case, it is possible that there may need to be at least N×M number of items that need to be reviewed at run-time to see if there is an existing child cursor that can be re-used. This results in runtime of O(nm). At the end of this lengthy and expensive process, it is still quite possible that none of the child cursors are usable, and that a new child cursor will need to be created to handle the current query execution. This could become a very inefficient and costly process, depending upon the number of child cursors and sharing criteria that have been established.

Embodiments of the present invention provide improved methods, systems, and media for cursor sharing and cursor pruning According to some embodiments, existing child cursors are distinguished using a cursor sharing criteria node structure. A sharing criteria node (also referred to as a "diagnostic" node) is created when a sharing criteria mismatch/failure happens. The node contains information about why the child cursor could not be shared and also information that can be used to quickly re-evaluate this sharing criterion in the future.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 3 illustrates a flowchart of a process for managing cursor sharing and cursor pruning according to some embodiments of the invention.

FIGS. 4A-L and 5A-T illustrate the process of FIG. 3.

DETAILED DESCRIPTION

As previously noted, cursor sharing is very desirable to allow improvements to database performance related to compiling, sharing and executing SOL and PL/SQL statements. By way of background, it is noted that cursor caching can be used on several levels to improve cursor re-execution time by maintaining reference to cached cursors and avoiding hard parse. For example, a first level of cursor caching may take place in a client-side statement cache that holds a cursor number for a particular SOL statement. The cached cursor number acts as a reference to the server side cursor that was previously executed for the same SOL statement. This cursor number is session specific and points to a particular server-side cursor instantiation object in a particular database session.

A second level of cursor caching could be implemented as a session cursor cache, which is a pool of previously executed cursor instantiation objects. Cursor instantiation objects maintain session specific states that were used during the previous execution to facilitate re-use during the same session. It could also contain a reference to the shared child cursor that was used during the last execution. A cache hit at this level would result in a soft parse in which one would go through a subset of sharing criteria checks.

A third possible level of cursor caching is the pool of child cursors in a system/general shared memory area. This is a possible last level of caching to avoid hard parsing. A soft parse at this level means that the system would go through the comprehensive list of sharing criteria check to find one existing child that can be shared.

Conventional shared cursor architectures are not efficient when there is a high number of shared cursors, e.g., where a parent cursor corresponds to a list of child cursors, and the process to find the right child cursor involves a linear scan of this list. As a result, shared cursor performance degrades exponentially as the number of child cursors increases.

Embodiments of the present invention provide improved methods, systems, and media for cursor sharing and cursor pruning According to some embodiments, the idea is to distinguish the existing child cursors using a cursor sharing criteria node structure. A sharing criteria node or diagnostic node is created when a sharing criteria mismatch or failure occurs. The node contains information about why the child cursor could not be shared and also information that can be used to quickly re-evaluate this sharing criterion in the future. Whenever there is an attempt to share this child cursor again in the future, the information already stored in the sharing criteria node can be used to possibly prune this child cursor from the search list. The result is that the entire list of sharing criteria can be reviewed for at most one child cursor regardless of the number of existing child cursors.

Figure 1:
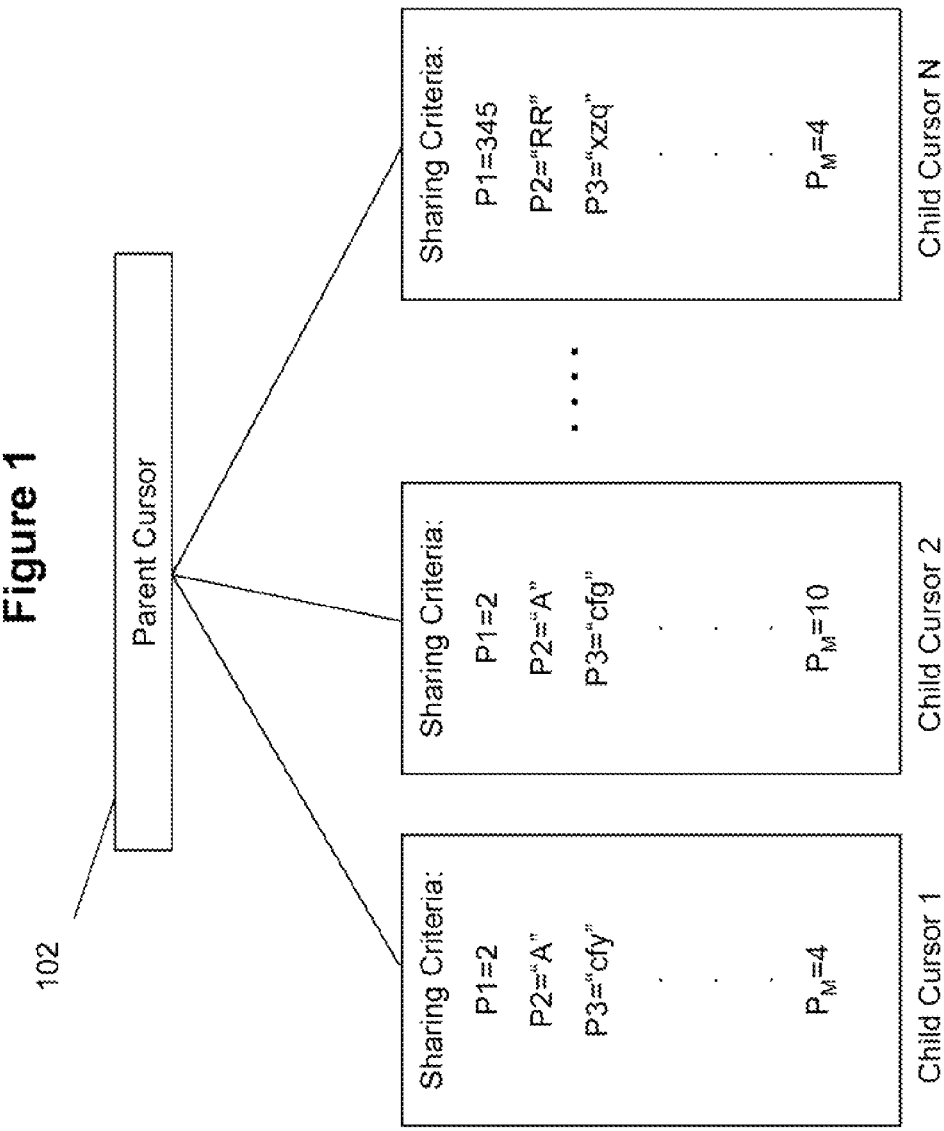
FIG. 1 illustrates an example parent/child node arrangement.
Figure 2:
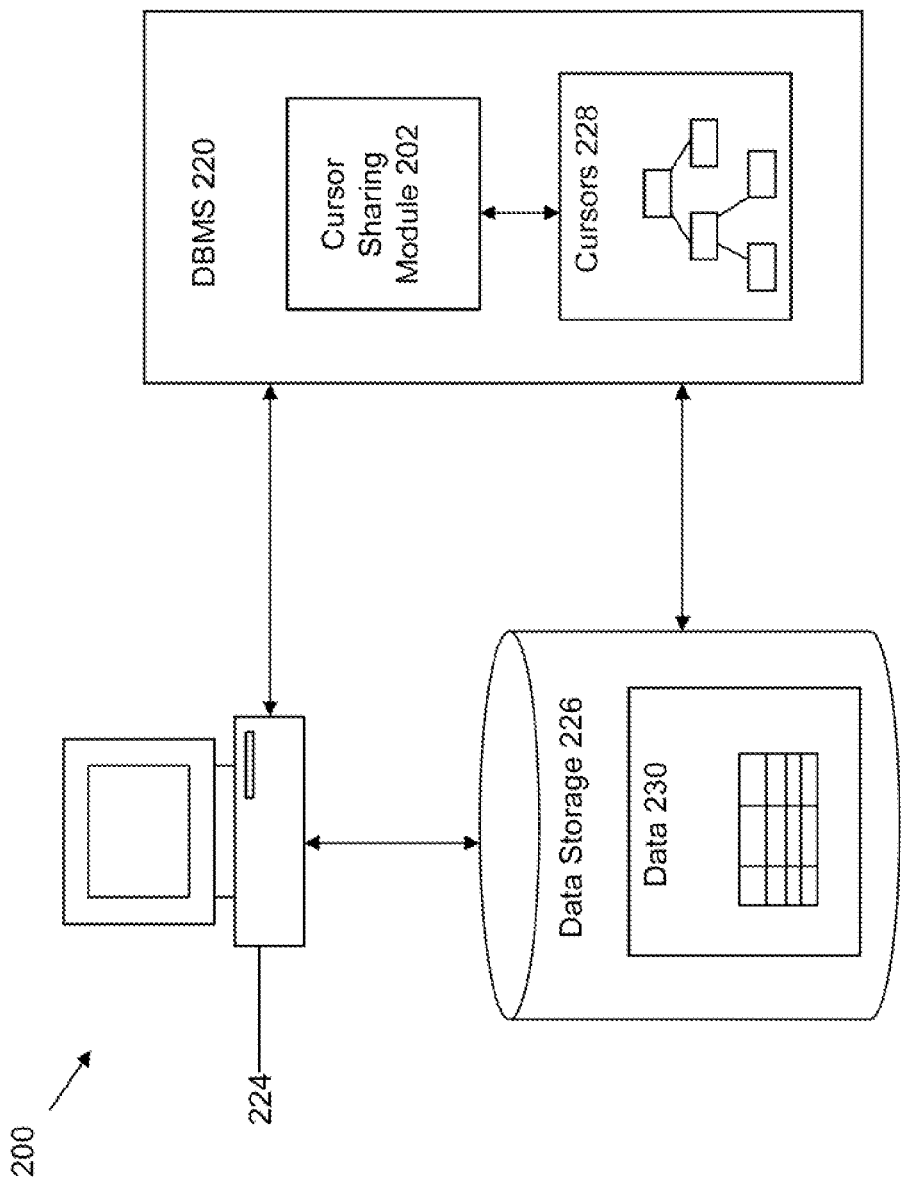
FIG. 2 illustrates an example system for managing cursor sharing.

FIG. 2 provides a high level illustration of a system 200 for managing cursor sharing and pruning according to some embodiments of the invention. System 200 may include one or more users at one or more user stations 224 that operate the system 200 to access database 230 in a data storage device 226. Database 230 may correspond to any type of database storage format or architecture, e.g., database tables in a relational database architecture. The database 230 may be managed and accessed using a database management system (DBMS) 220.

User station 224 comprises any type of computing station that may be used to access, operate, or interface with data storage device 226, whether directly or remotely over a network. Examples of such user stations 224 include for example, workstations, personal computers, or remote computing terminals. User station 224 comprises a display device, such as a display monitor, for displaying processing results or data to users at the user station 224. User station 224 also comprises input devices for a user to provide operational control over the activities of some or all of system 200.

DBMS 220 provides management for some or all of the database functionality and operations utilized in system 200. Using cursor sharing module 202, DBMS 220 allows for the efficient sharing of cursors 228. The general approach to implement the cursor sharing module 202, according to some embodiments, is to distinguish the existing child cursors using a cursor sharing criteria node structure. A diagnostic/sharing criteria node is created when a sharing criteria mismatch/failure happens, and contains information about why the particular child cursor could not be shared and also information that is necessary or useful to quickly re-evaluate this sharing criterion in the future. Whenever there is an attempt to share this child cursor again in the future, the information already stored in the sharing criteria node is used to possibly prune this child cursor from the search list.

For instance, suppose that there is already one child cursor that has been built. Later, another session attempts to share this child cursor, and while going through the list of sharing criteria, it is found that the child cursor cannot be shared because of sharing criterion A. At this point, the cursor sharing module 202 will create two sharing criteria nodes of sharing criterion A, one for child cursor number 1 and one for child cursor number 2. From that point on, criterion A will serve as the distinguishing criterion between child number 1 and number 2.

Suppose a third session now needs a cursor. The third session will first look at the sharing criteria node created for child cursor 1, and if it finds that it matches sharing criterion A, then it will evaluate the rest of the sharing criteria for child cursor 1; otherwise, it will simply prune child cursor 1 from its search list. Therefore, the entire list of sharing criteria will be evaluated for at most one child cursor.

Note that this approach could potentially end up with a large number of sharing criteria nodes, one per sharing criterion. As a further optimization, the system may dynamically reorganize the nodes when the number of nodes grows above a certain threshold, where the ordering of the nodes will be determined by the selectivity of the associated sharing criteria. In this optimization, nodes with higher sharing criteria selectivity will be evaluated earlier during the pruning process.

FIG. 3 shows a process for managing cursor sharing and pruning according to some embodiments of the invention. It is noted that an initial action that may be taken prior to the process of FIG. 3 is to compile a list of child nodes for the already-existing child cursors. Therefore, when a request is received to execute a query, then at 302, a child node from the list of child nodes for the previous child cursors can be selected for processing to determine if the child cursor is appropriate for re-use and cursor sharing.

The child node may already be associated with one or more diagnostic nodes, which corresponds to one or more sharing criteria that have previously been identified as causing a mismatch with previous attempts to share its corresponding child cursor. If so, then at 304, that previous sharing criteria is checked against the sharing criteria for the current session. If there is a mis-match between the stored sharing criteria for the child node and the sharing criteria for the current session, then the child node/cursor can be immediately pruned from the list at 306.

This highlights one of the key advantages of the approach, where a child node can be checked very quickly and efficiently to see if its corresponding cursor can be re-used for the current session. Instead of potentially requiring all M number of sharing criteria to be checked and stored for each child node, it is likely that only a small number of sharing criteria that are already stored for the existing nodes/cursors need to be checked for most of the child nodes.

If there is not a mis-match with the already-stored sharing criteria for the child node, then at 308, the process iterates through the other sharing criteria (not already in a diagnostic node) to see if the child cursor is appropriate for sharing/re-use. A determination is made whether there are any mis-matches between the sharing criteria for the current session and the child cursor. If there is a good match for all for of the sharing criteria, then the child cursor can be re-used at 312.

On the other hand, if there is an identified mismatch in the sharing criteria, then at 314, a diagnostic node for the mis-matched sharing criterion is added to the child node, and the child node/cursor is pruned from consideration for sharing at 306.

A determination is made at 316 whether there are any further existing child nodes/cursors to consider for sharing. If so, then the process returns back to 302 to select another child node for processing. If not, then a new child cursor is created at 318, and its corresponding child node added to the tree of nodes for the parent cursor.

The previously identified mis-matched sharing criterion is added to the newly created child node at 320. In this approach, a sharing criteria node is made only if it helps to distinguish the existing child cursors from another existing child cursor. In other words, each node helps the process to get rid of at least one potential child cursor candidate. To explain, consider the degenerate case in which each node helps to get rid of exactly one potential child cursor, and when going through P nodes reduces the cardinality of the candidate child cursor set to (n−p). The worst case running time becomes O(p+(n−p)*p). Note that a sharing criteria node is created only when it is needed to create one new child cursor, so n=p and the running time is therefore linear.

According to some embodiments, each sharing criterion corresponds to a sharing criteria identifier, a sharing criteria evaluation functionality, a diagnostic functionality, a pruning functionality, and an end-of-compile functionality. The evaluation functionality is used to determine whether the sharing criterion matches or not. If the result is a mismatch, a new sharing criteria node is created for the existing child cursor. The diagnostic functionality is performed to dump out the diagnostic information stored under the sharing criteria node. The pruning functionality is performed whenever there is an attempt to share a child cursor with at least one existing sharing criteria node attached. The pruning functionality decides whether the system can prune the child cursor from the search list. Finally, the end-of-compile functionality is performed after a new child cursor is created because of mismatch of the specified sharing criteria. The end-of-compile functionality is used to create a sharing criteria node and attach it to this new child cursor to enable the effective efficient pruning.

Any suitable sharing criterion may be utilized in conjunction with the invention. Examples of sharing criteria include system settings, optimizer settings, user personal settings, privileges and authorization levels, and different mappings that may occur to system objects and tables.

According to the present embodiment, all the sharing criteria nodes have a common header structure. The payload portion of the sharing criteria node itself is free format and can be specified dynamically, e.g., to store ACL (access control list) IDs and evaluation results for ACL mis-matches; mismatching bind position, data type, and length for bind variable mis-matches. Within the same sharing criteria, one implementation approach can be to have different payload formats depending on a mis-match reason (or reason code) stored in the header of the node.

Each parent cursor can be configured to keep track of the number of child cursors created due to each specific sharing criteria failure. This number of child cursors defines the selectivity of a sharing criterion, and it grows as the number of child cursors increases. Initially, when the number of child cursors is small, the sharing criteria nodes are organized as a linked list in the child cursor. To select the appropriate child cursor, for each sharing criteria node in the list, the system would call the pruning function/functionality that is defined. The pruning functionality would evaluate the corresponding sharing criteria and decides whether the system can prune this child cursor from the candidate search list.

At the beginning of the process, the candidate child cursor search list includes all of the existing child cursors. While going through the sharing criteria nodes, the system continues to reduce the size of this list by pruning the ones that do not satisfy the sharing criteria. When the number of child cursors (nodes) increase above a certain threshold, the system will sort the linked list in descending order of selectivity so that pruning can be carried out more effectively.

As is evident from the above, runtime analysis of cursor sharing is greatly enhanced in terms of speed and efficiency using the present invention. In this new approach of embodiments of the current invention, a sharing criteria node is made only if it helps to distinguish the existing child cursors from another existing child cursor. In other words, when the system evaluates a pair of sharing criteria node, it can get rid of at least one (and possibly at most two) potential child cursor candidate.

If there are N child cursors, there will be 2(n−1) sharing criteria node. After finishing the evaluation of all 2(n−1) sharing criteria nodes, there will only be at most 1 candidate child cursor left, and therefore there will only need to be an evaluation of the entire list of sharing criteria on at most 1 child cursor. Therefore, the runtime becomes 0(2(n−1)+p) which is linear.

Figure 4B:
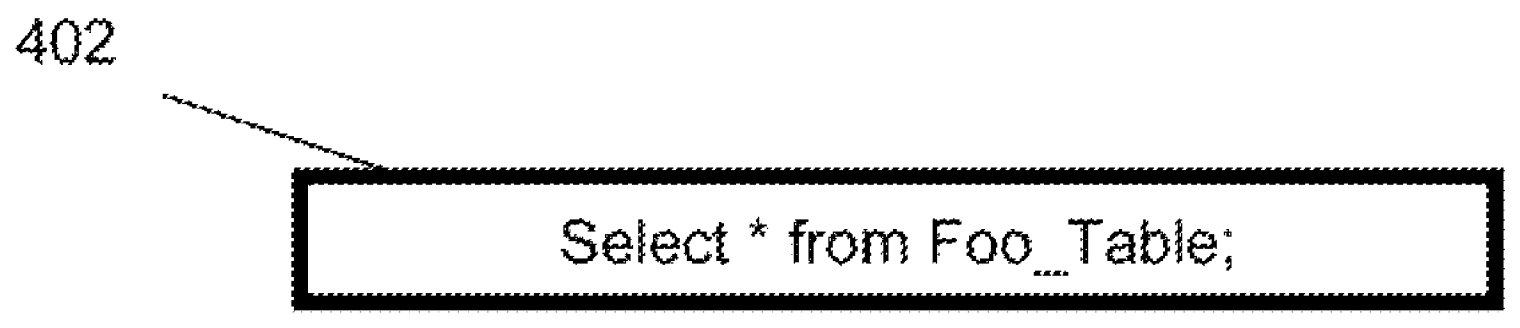
Figure 4H:
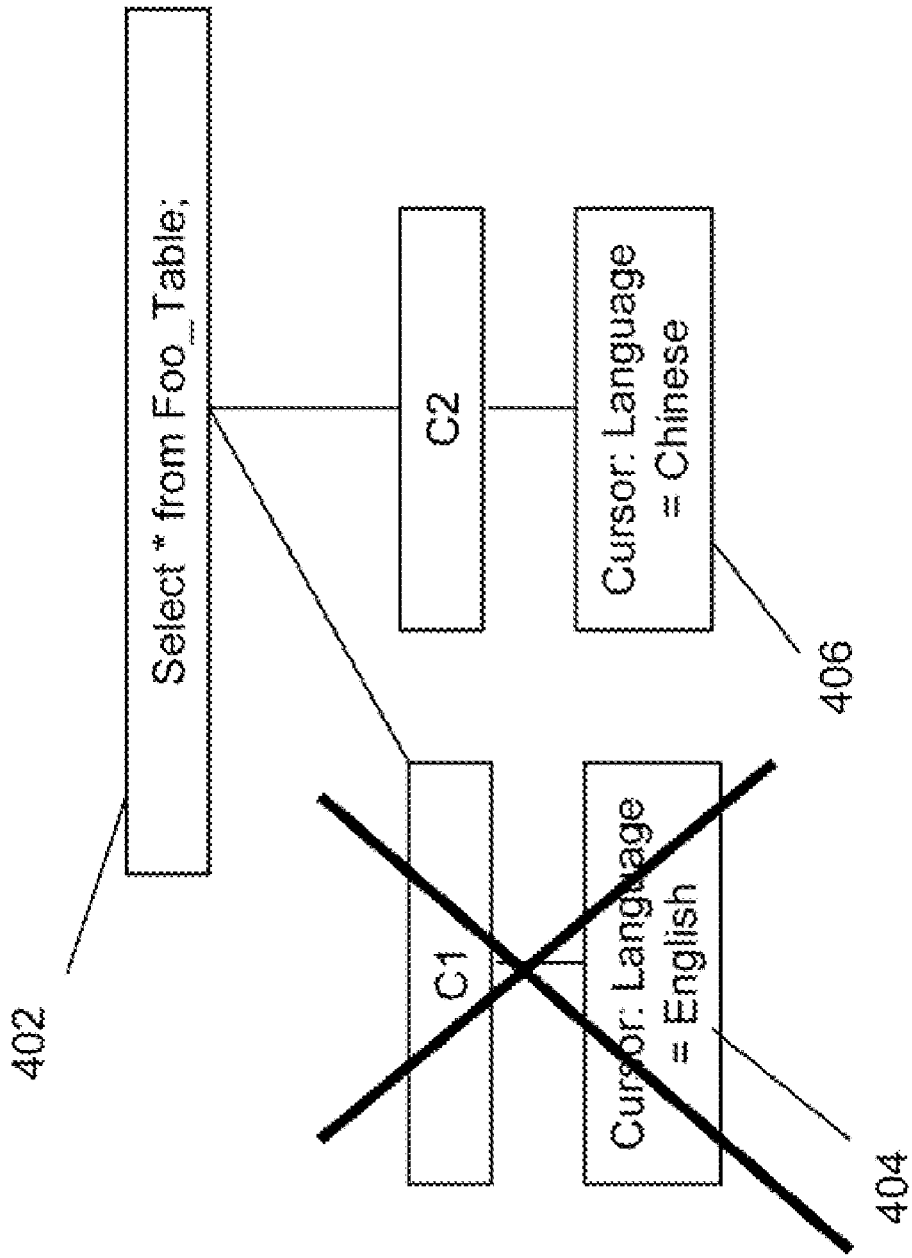

FIGS. 4A-L provides a very simple illustrative example of this process according to some embodiments of the invention. FIG. 4A is a chart that shows a single sharing criterion that has been established for an example query "Select * from Foo_Table;", where the sharing criterion focuses on the language setting that should be established for the session. The language setting is part of the connection set-up for a session, and is a configuration setting that may change the way that an execution plan is handled for a given query. As such, it is quite likely that a cursor that has been established for a first language may not be sharable for a subsequent execution of the exact same query that requires a second language setting. For purposes of this illustrative example, it is assumed that a different language setting will prevent sharing of cursors. In the current example of FIG. 4A, User 1 requires a session having an "English" language setting, User 2 requires the "Chinese" language setting, and User 3 requires the "French" language setting.

FIG. 4B shows the establishment of a parent cursor 402 for the current query "Select * from Foo_Table;". Assume that User 1 establishes a session for execution of the query, and that there has not been a previous execution of the query. At this point, a new child cursor C1 is created for User 1's execution of the query. As shown in FIG. 4C, a child node corresponding to C1 is associated with the parent node 402.

At a later point in time, assume that User 2 seeks to establish a session to execute the query. At this point, the previous child cursor C1 is checked to see if it can be re-used to allow User 2 to execute the query. First, a list of the child nodes is compiled, which in the present case includes only one child node C1. Since there have not been any previous mis-matches against the child node C1, this child node does not yet have any previously mis-matched sharing criteria associated with the child node (i.e., no diagnostic nodes are yet associated with C1). Therefore, the system will iterate through all of the sharing criteria to see if there are any mis-matches between settings for User 2 and the sharing criteria set up for C1.

In the present situation, there is a mis-match since C1 is associated with a sharing criterion for language set to English, whereas User 2 is configured to be associated with a sharing criterion for language set to Chinese. Therefore, as shown in FIG. 4E, child node C1 is pruned from the list of candidate child cursors, and as shown in FIG. 4D, a new object/data in the form of a sharing criteria node 404 is created to be associated with child node C1. The sharing criteria node 404 identifies the reason for pruning C1 from the list of candidate child nodes, i.e., because of the existence of a mis-match for the language setting since the language setting for C1 is English.

Therefore, a new cursor C2 is created to execute the query for User 2. As shown in FIG. 4F, a new child node corresponding to child node C2 is added to the cursor hierarchy, and a sharing criteria node 406 is created to be associated with C2. The sharing criteria node 404 identifies the reason for creating C2 instead of using an existing child cursor, i.e., because of the existence of a mis-match for the language setting since the language setting for C2 is Chinese.

At a later point in time, assume that User 3 seeks to establish a session to execute the query. At this point, the previous child cursors C1 and C2 are checked to see if either one can be re-used to allow User 3 to execute the query. First, a list of the existing child nodes is compiled, which in the present case includes a list that has both C1 and C2.

The example process begins by checking C1. Since there have been at least one previous mis-match against the child node C1, this child node does have a previously mis-matched sharing criteria associated with the child node. Therefore, as shown in FIG. 4G, the system will begin by checking the sharing criteria node 404 for C1 against the sharing criteria for User 3. Here, it can be seen right away that the language sharing criteria of English recorded in the sharing criteria node 404 does not match the sharing criteria language value of French required for User 3. Therefore, as shown in FIG. 4H, C1 can be immediately pruned from the list of candidate cursors to be shared with User 3.

Figure 4I:
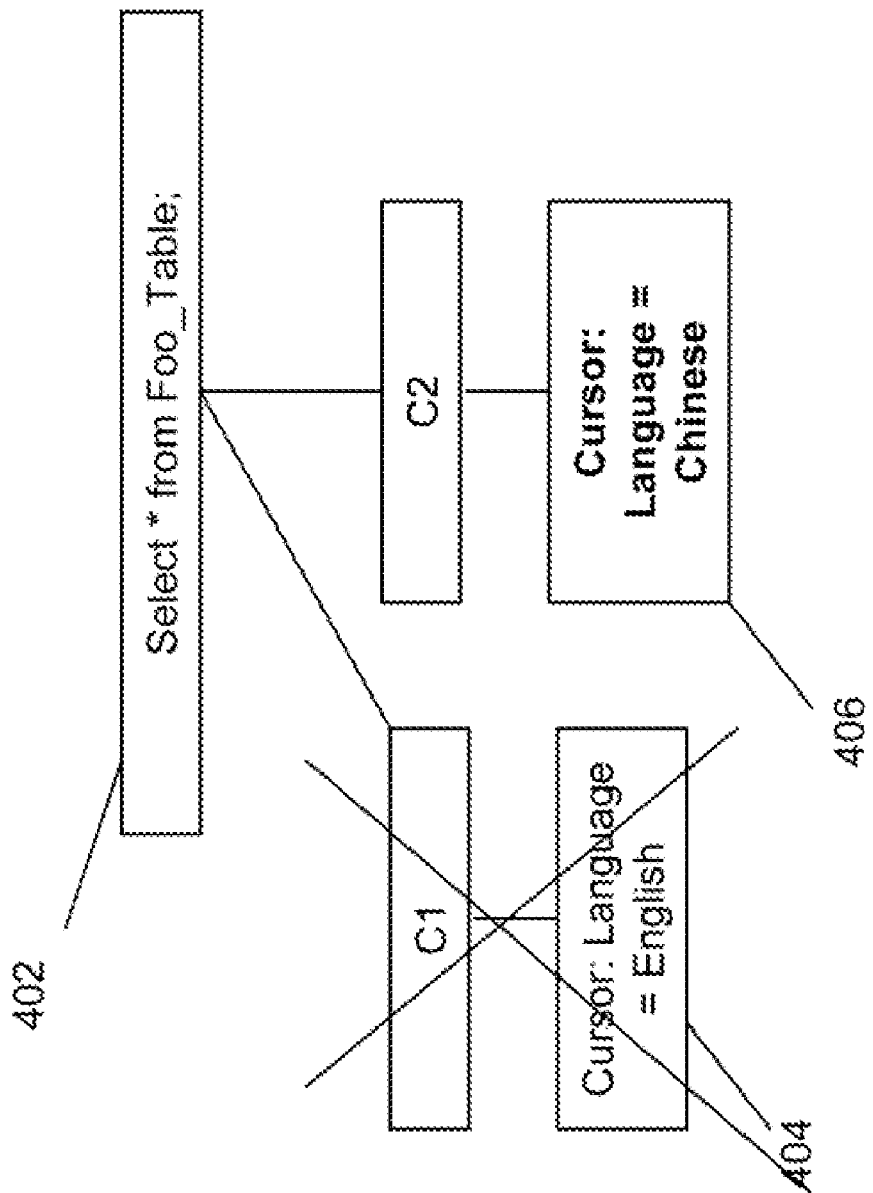

The example process next checks the suitability of sharing C2 with User 3 as shown in FIG. 4I. Since child node C2 is already associated with a sharing criteria node 406, the sharing criteria value recorded in this node 406 is checked against the sharing criteria for User 3. Here, it can be immediately discovered that the language sharing criteria of Chinese recorded in the sharing criteria node 406 does not match the sharing criteria language value of French required for User 3. Therefore, as shown in FIG. 4J, C2 can be immediately pruned from the list of candidate cursors to be shared with User 3.

There are no further candidate child cursors that can be re-used for the execution of the query for User 3. Therefore, a new cursor C3 is created to execute the query for User 3, and a new child node for C3 is added to the cursor hierarchy as shown in FIG. 4K. A new object/data in the form of a sharing criteria node 408 is created to be associated with child node C3, where the sharing criteria node 408 identifies the reason for creating new node C3, i.e., because of the existence of a mis-match for the language setting since the language setting for C3 is French.

FIG. 4L shows the state of the cursor hierarchy after execution of the query for User 3, where the cursor hierarchy indicates that the cursor cache now includes three sharable child cursors C1, C2, and C3. The sharing criteria nodes 404, 406, and 408 provide information that can be used to quickly determine whether any new queries executions can utilize and re-use any of these cursors.

While the example of FIGS. 4A-L is a very simple example using only a single sharing criterion, it is noted that the present invention is usable with complex implementations that involve large numbers of sharing criteria.

FIGS. 5A-T provide a more complex illustrative example of this process that considers multiple sharing criteria. FIG. 5A is a chart that shows the sharing criteria that has been established for another example query "Select * from T1;", where this example shows four types of sharing criteria for this query. As previously noted, the "language" sharing criteria focuses on the language setting that should be established for the session. In the present example, the language setting for User 1, User 3, and User 4 is "Chinese", while the language setting for User 2 is English.

The "security level" sharing criteria addresses the security level or level of authorizations that correspond to the query execution by a given user/session. In the present example, the security level setting for User 2, User 3, and User 4 is "2", while the security level setting for User 1 is "1".

The "table resolution/mapping" criteria addresses how resources may be mapped differently, depending upon the specific user or session that is executing the query. For example, when User 1 is executing the query, then the table variable T1 resolves to a table "Michael.T1". When User 2 is executing the query, then the table variable T1 resolves to a table "Scott.T1". However, when either User 3 or User 4 is executing the query, then the table variable T1 resolves to a default table.

The "optimizer setting" sharing criterion corresponds to any appropriate optimizer configuration setting that may be established to compile and create an execution plan for the query. In the present example, the optimizer setting for User 1 and User 3 is "4", the optimizer setting for User 2 is "5", and the optimizer setting for User 4 is "3".

Figure 5B:

FIG. 5B shows the establishment of a parent cursor 502 for the current query "Select * from T1;". Assume that User 1 establishes a session for execution of the query, and that there has not been a previous execution of the query. At this point, a new child cursor C1 is created for User 1's execution of the query. As shown in FIG. 5C, a child node corresponding to C1 is associated with the parent node 502.

At a later point in time, assume that User 2 seeks to establish a session to execute the query. At this point, the previous child cursor C1 is checked to see if it can be re-used to allow User 2 to execute the query. First, a list of the candidate child nodes is compiled, which in the present case includes a list of only one child node C1. Since there has not been any previous mis-matches against the child node C1, this child node does not yet have any previously mis-matched sharing criteria associated with the child node. Therefore, the system will iterate through all of the sharing criteria to see if there are any mis-matches between settings for User 2 and the sharing criteria set up for C1.

In the present situation, there is a mis-match since C1 is associated with a sharing criterion for language set to Chinese, whereas User 2 is configured to be associated with a sharing criterion for language set to English. Therefore, as shown in FIG. 5D, a new object/data in the form of a sharing criteria node 504 is created to be associated with child node C1, and the child node C1 will be pruned from the list of candidate cursors. The sharing criteria node 504 identifies the reason for pruning C1 from the list of candidate cursors/nodes, i.e., because of the existence of a mis-match for the language setting since the language setting for C1 is Chinese whereas User 2 needs the query executed with a language setting for English.

Figure 5E:
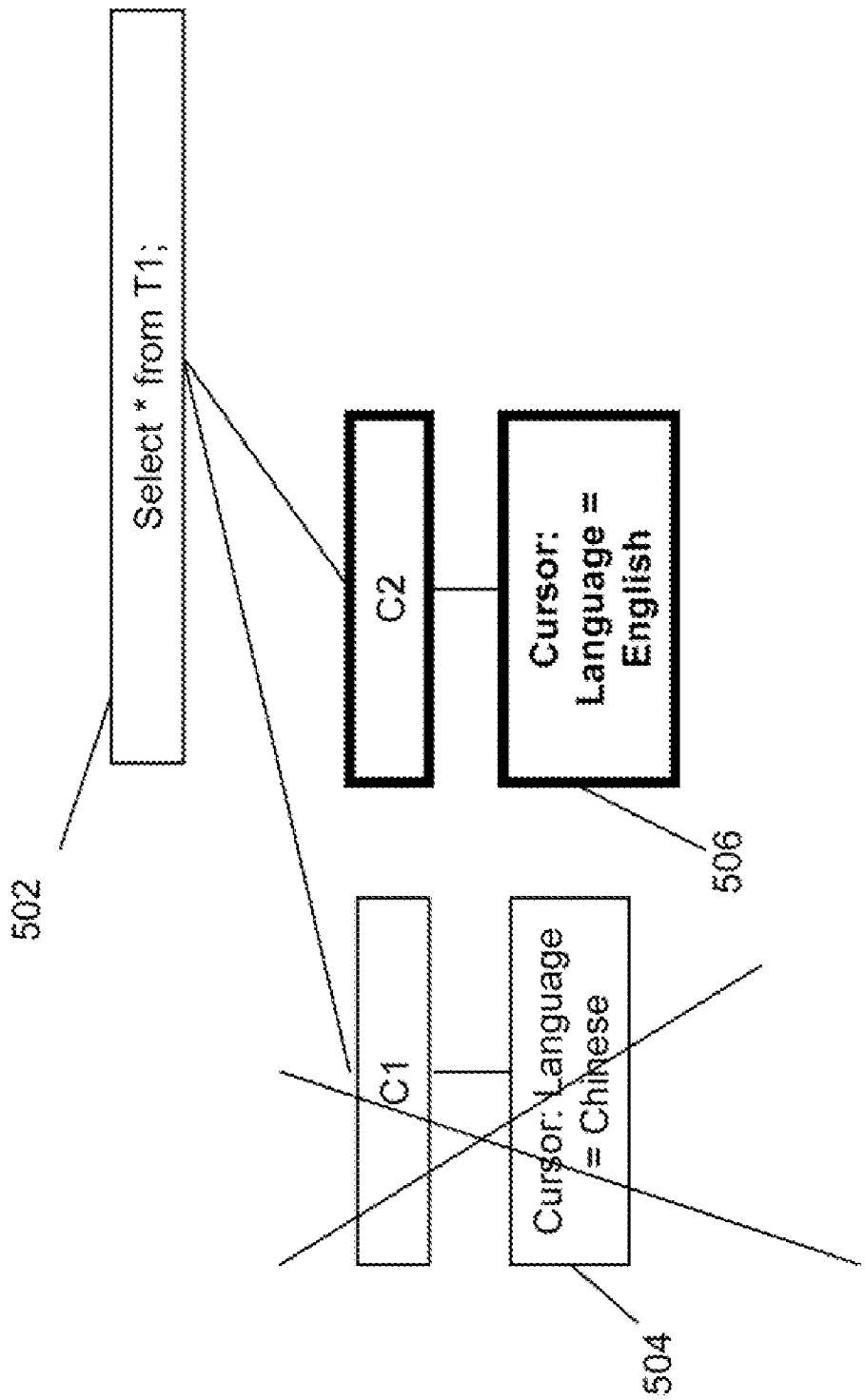

Therefore, a new cursor C2 is created to execute the query for User 2. As shown in FIG. 5E, a new child node corresponding to child node C2 is added to the cursor hierarchy, and a sharing criteria node 506 is created to be associated with C2. The sharing criteria node 506 identifies the reason for creating C2 instead of using an existing child cursor, i.e., because of the existence of a mis-match for the language setting since the language setting for C2 is English.

At a later point in time, assume that User 3 seeks to establish a session to execute the query. At this point, the previous child cursors C1 and C2 are checked to see if either one can be re-used to allow User 3 to execute the query. First, a list of the existing child nodes is compiled, which in the present case includes a list that includes both C1 and C2.

Figure 5F:
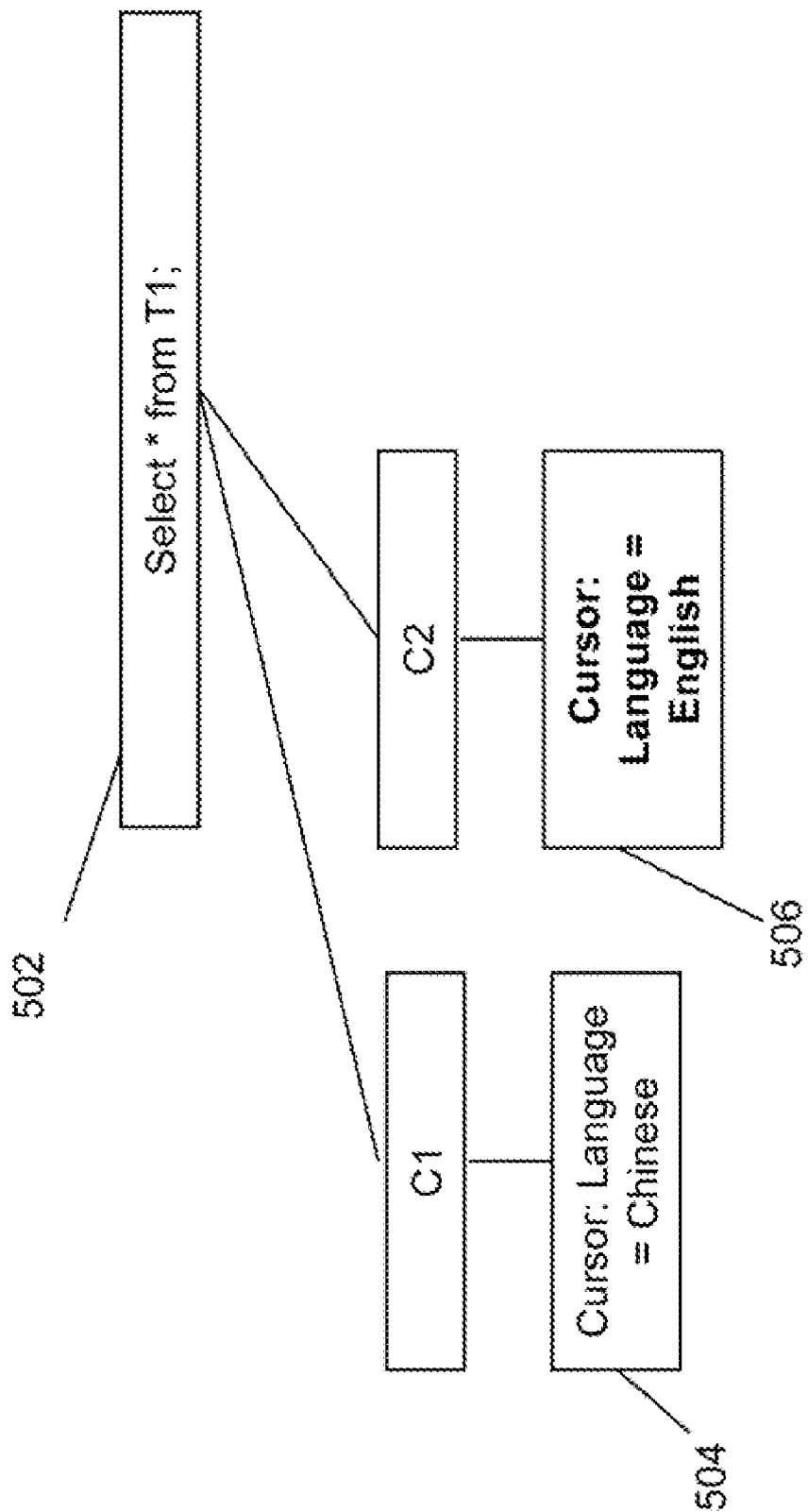

In this example, the process begins by checking C2. As shown in FIG. 5F, the system will begin by checking the sharing criteria node 506 for C2 against the sharing criteria for User 3. Here, it can be seen right away that the language sharing criterion of English recorded in the sharing criteria node 506 does not match the sharing criterion language value of Chinese required for User 3. Therefore, as shown in FIG. 5G, C2 can be immediately pruned from the list of candidate cursors to be shared with User 3.

The example process next checks the suitability of sharing C1 with User 3 as shown in FIG. 5H. Since child node C1 is already associated with a sharing criteria node 504, the sharing criteria value recorded in this node 504 is checked against the sharing criteria for User 3. Here, it can be immediately discovered that the language sharing criterion of Chinese recorded in the sharing criteria node 504 does match the sharing criterion language value of Chinese required for User 3. Therefore, C1 cannot be immediately pruned from the list of candidate cursors to be shared with User 3.

Therefore, the system will iterate through all of the sharing criteria between C1 and the settings for User 3 to see if there are any mis-matches for the sharing criteria. In the present situation, there is a mis-match since C1 is associated with a sharing criterion for security level set to "1", whereas User 3 is configured to be associated with a sharing criterion for the security setting of "2". Therefore, as shown in FIG. 5I, child node C1 is pruned from the list of candidate child cursors and a new object/data in the form of a sharing criteria node 514 is created to be associated with child node C1. The sharing criteria node 514 identifies the reason for pruning C1 from the list of candidate child nodes, i.e., because of the existence of a mis-match for the security level setting since the setting for C1 is "1" whereas User 3 needs a security level setting of "2".

Figure 5J:
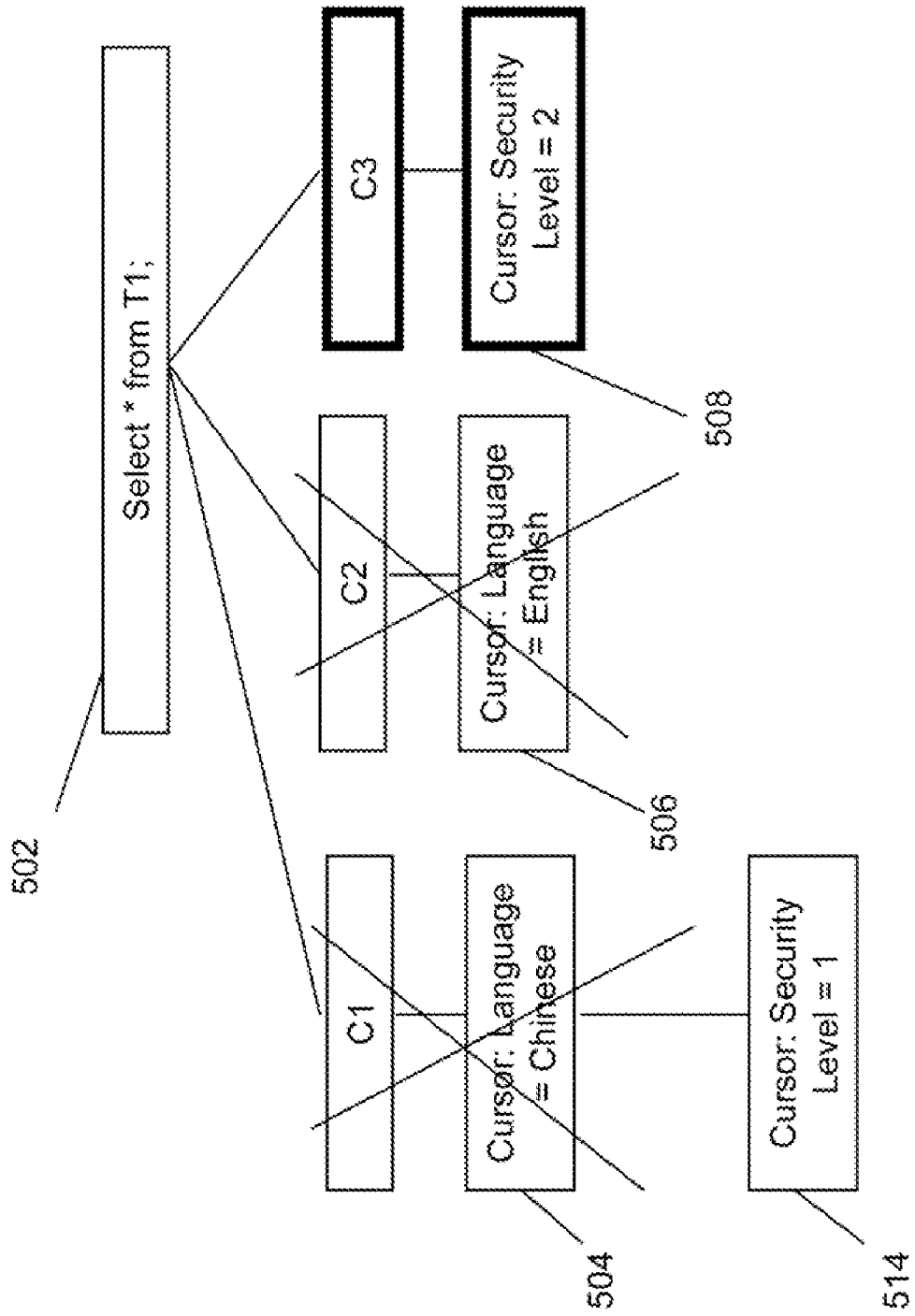

There are no further candidate child cursors that can be re-used for the execution of the query for User 3. Therefore, a new cursor C3 is created to execute the query for User 3, and a new child node for C3 is added to the cursor hierarchy as shown in FIG. 5J. A new object/data in the form of a sharing criteria node 508 is created to be associated with child node C3, where the sharing criteria node 508 identifies the reason for creating new node C3, i.e., because of the existence of a mis-match for the security level setting since the setting required for C3 is "2".

At a later point in time, assume that User 4 seeks to establish a session to execute the query. At this point, the previous child cursors C1, C2 and C3 are checked to see if any can be re-used to allow User 4 to execute the query. First, a list of the existing child nodes is compiled, which in the present case is a list that includes C1, C2, and C3.

Figure 5K:
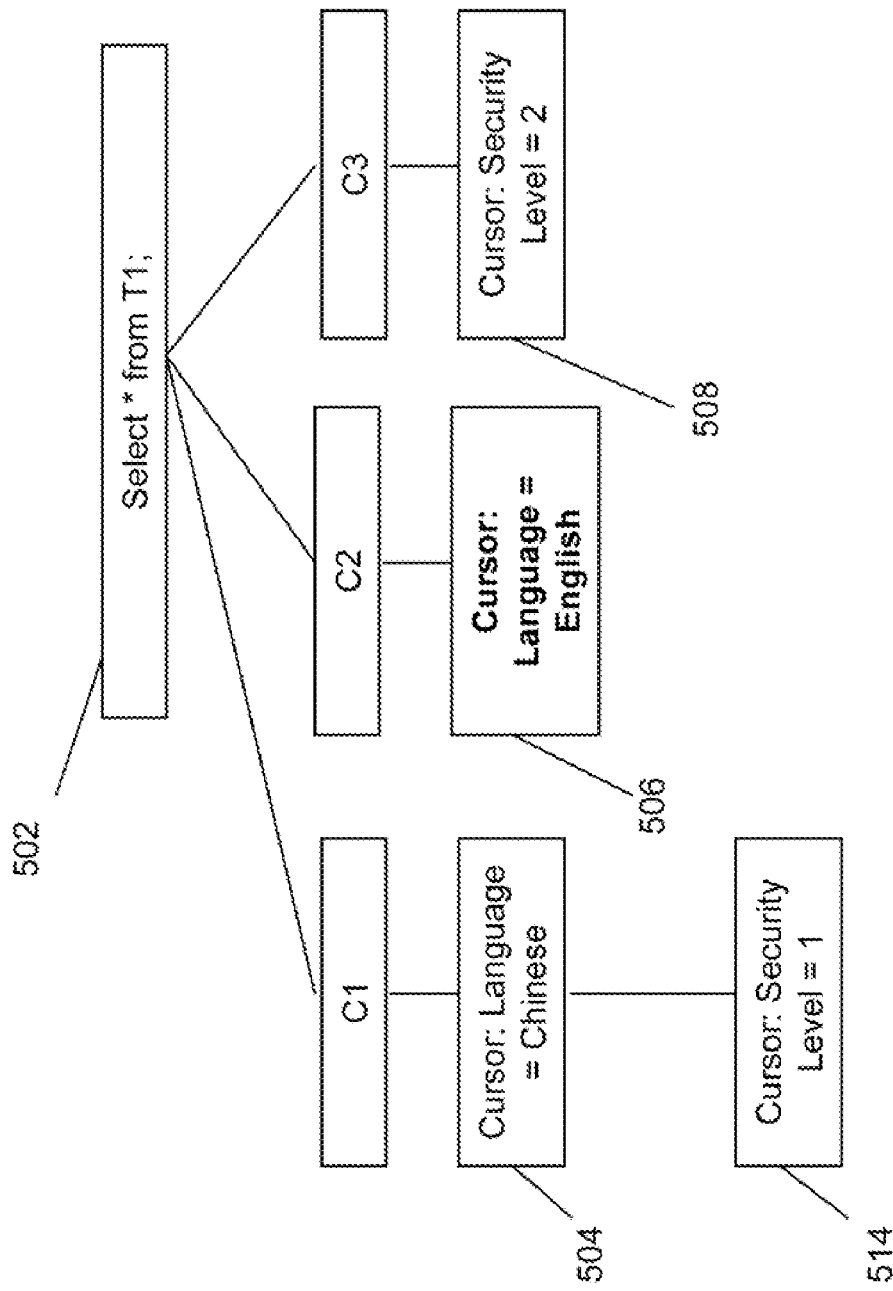
Figure 5L:
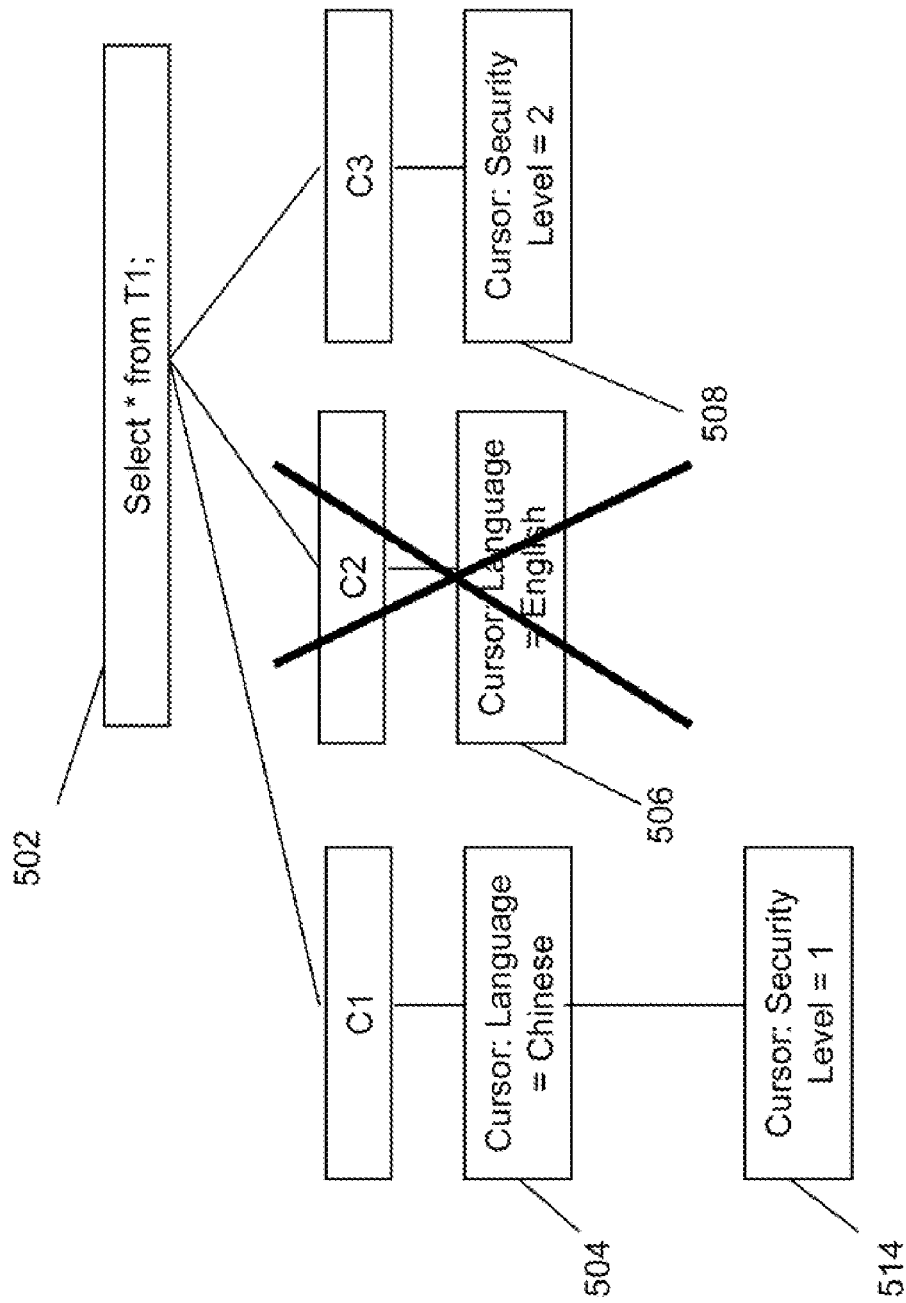

In this example, the process begins by checking C2. As shown in FIG. 5K, the system will begin by checking the sharing criteria node 506 for C2 against the sharing criteria for User 4. Here, it can be seen right away that the language sharing criterion of English recorded in the sharing criteria node 506 does not match the sharing criterion language value of Chinese required for User 4. Therefore, as shown in FIG. 5L, C2 can be immediately pruned from the list of candidate cursors to be shared with User 4.

Figure 5M:
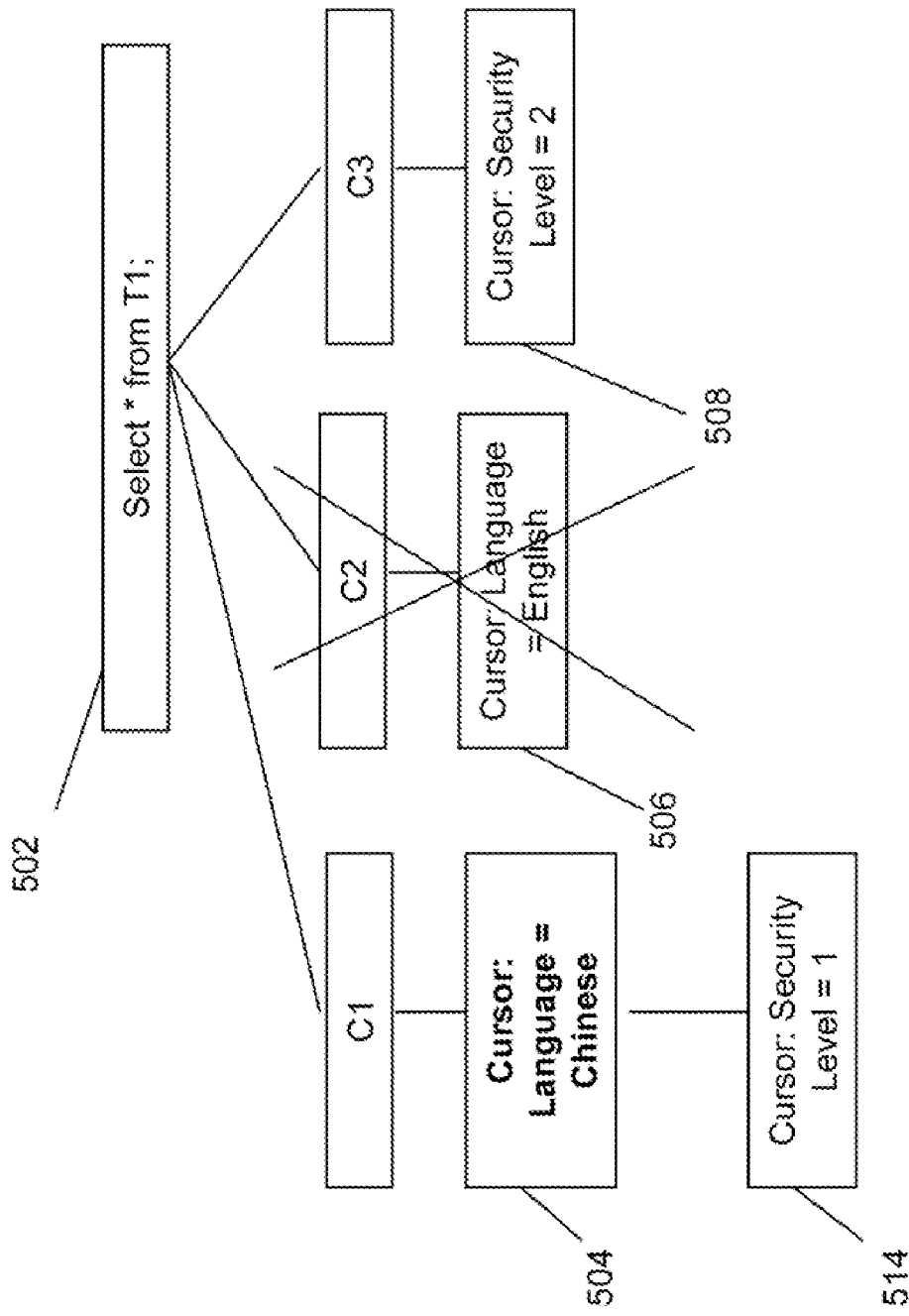
Figure 5N:
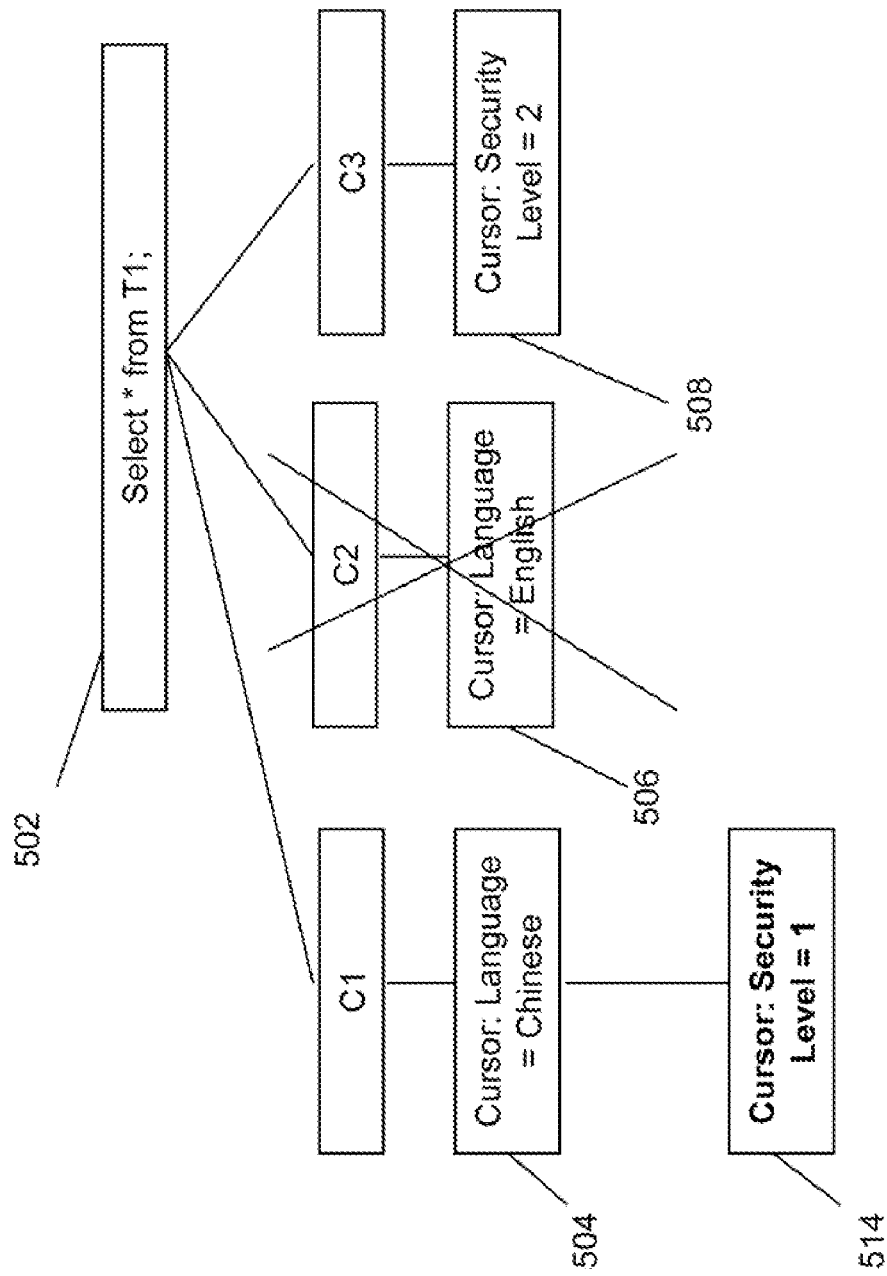
Figure 50:
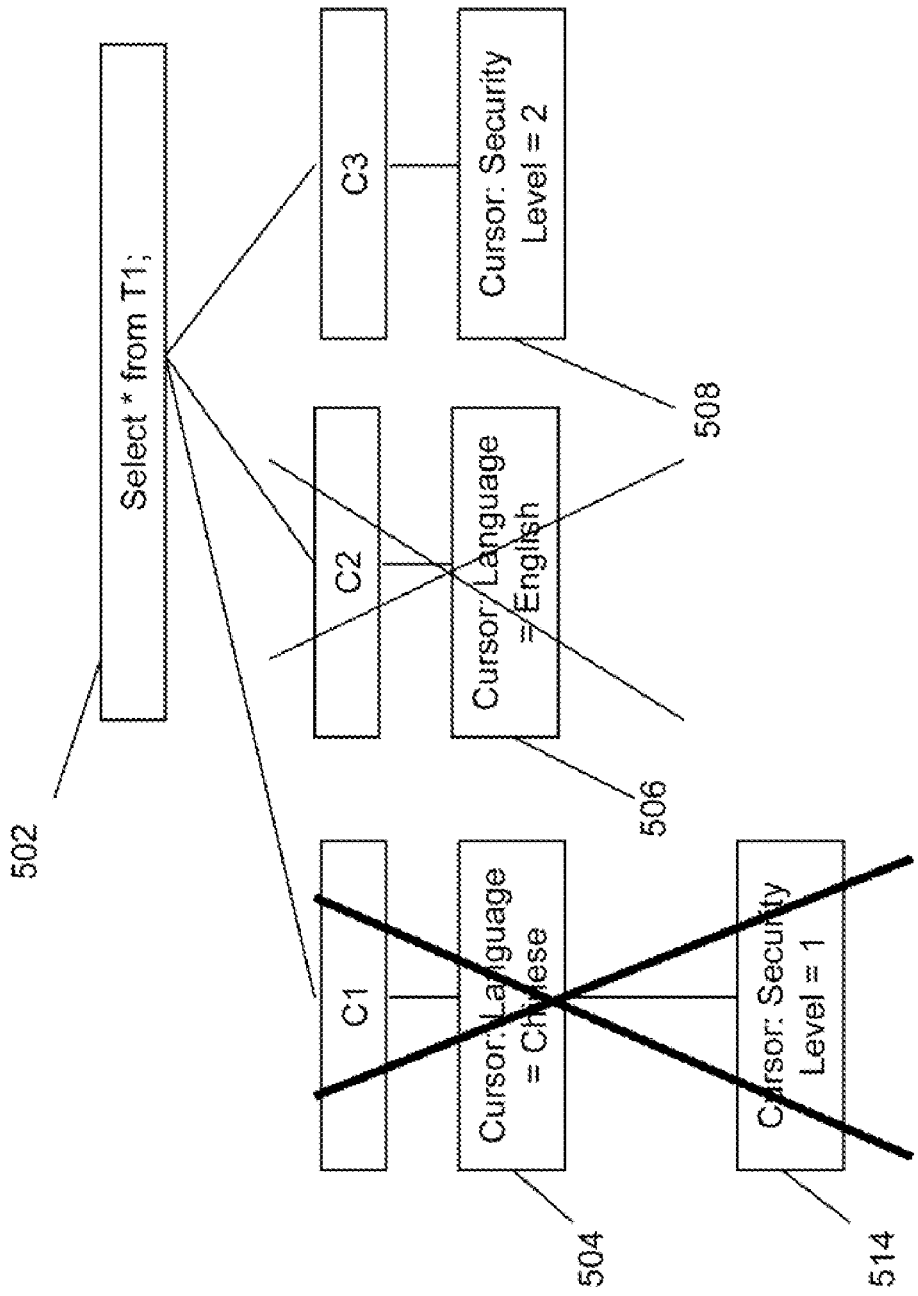

The example process next checks the suitability of sharing C1 with User 4. Since child node C1 is already associated with sharing criteria nodes 504 and 514, the sharing criteria values recorded in nodes 504 and 514 are checked against the sharing criteria for User 4. Here, as illustrated in FIG. 5M, checking the language sharing criterion of Chinese recorded in the sharing criteria node 504 shows a match with the sharing criterion language value of Chinese required for User 4. However, as illustrated in FIG. 5N, checking the security level sharing criterion of "1" recorded in sharing criteria node 514 shows a mis-match with the required security level setting of "2" for User 4. Therefore, C1 can be pruned from the list of candidate cursors to be shared with User 4, as illustrated in FIG. 5O.

Figure 5P:
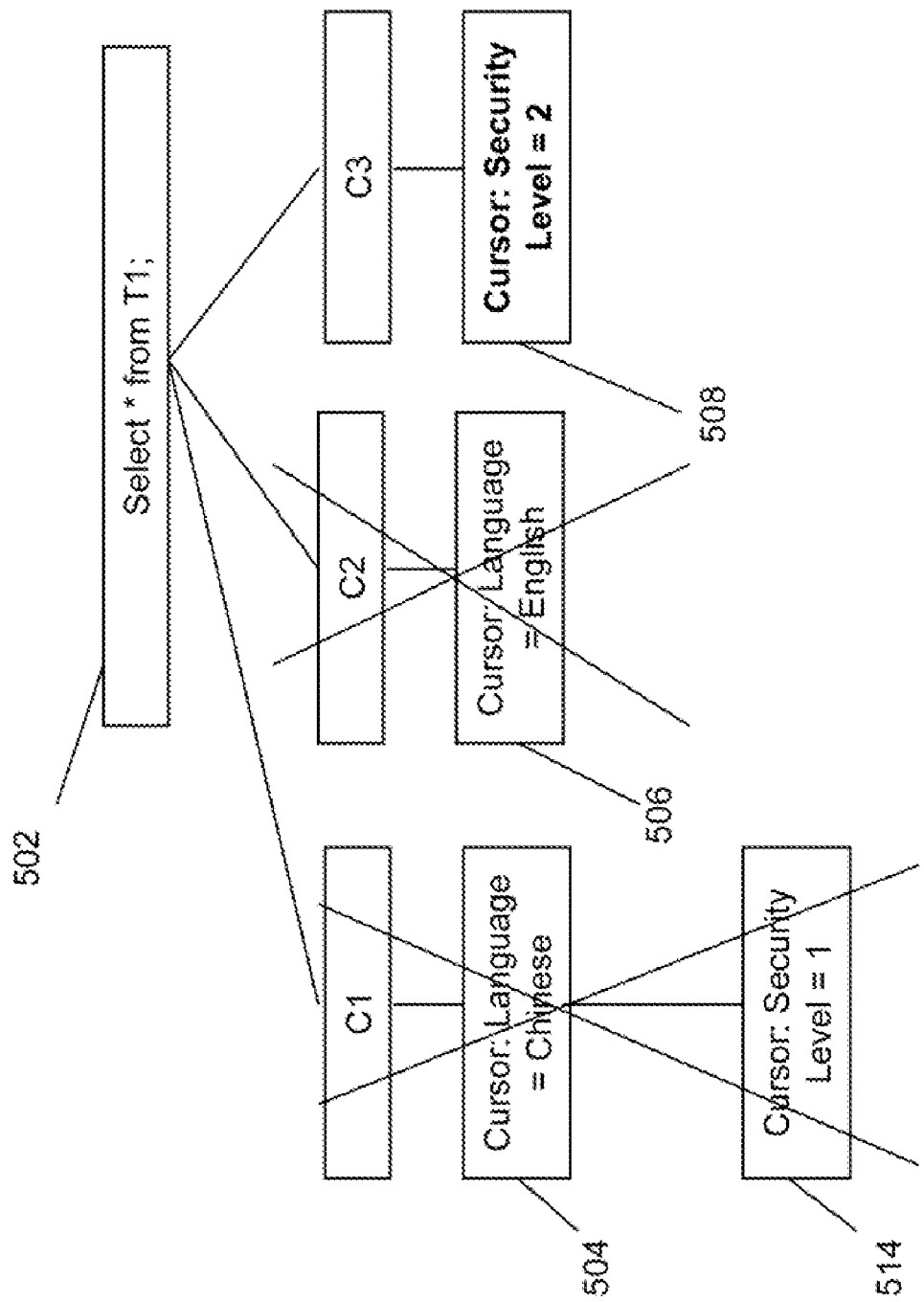

The example process next checks the suitability of sharing C3 with User 4 as shown in FIG. 5P. Since child node C3 is already associated with a sharing criteria node 508, the sharing criteria value recorded in this node 508 is checked against the sharing criteria for User 8. Here, it can be immediately discovered that the security level sharing criterion of "2" recorded in the sharing criteria node 508 does match the sharing criterion security level of "2" for User 4. Therefore, C3 cannot be immediately pruned from the list of candidate cursors to be shared with User 4.

Figure 5R:
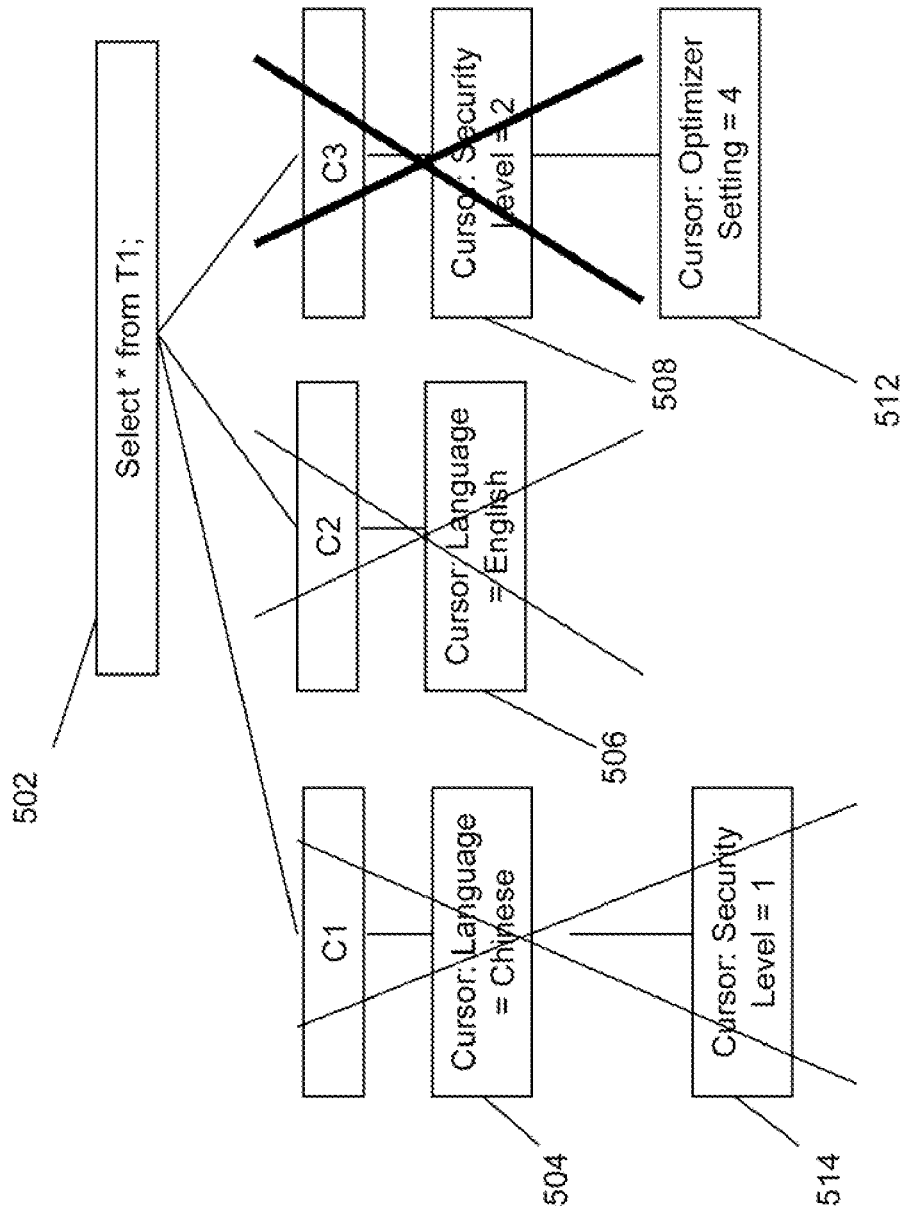

Therefore, the system will iterate through all of the sharing criteria between C3 and the settings for User 4 to see if there are any mis-matches for the sharing criteria. In the present situation, there is a mis-match since C3 is associated with a sharing criterion for optimizer setting of "4", whereas User 4 is configured to be associated with a sharing criterion for the optimizer setting of "3". Therefore, as shown in FIG. 5Q, a new object/data in the form of a sharing criteria node 512 is created to be associated with child node C3. As shown in FIG. 5R, child node C3 is pruned from the list of candidate child cursors. The sharing criteria node 512 identifies the reason for pruning C3 from the list of candidate child nodes, i.e., because of the existence of a mis-match for the optimizer setting since the setting for C3 is "4" whereas User 4 needs an optimizer setting of "3".

Figure 5S:
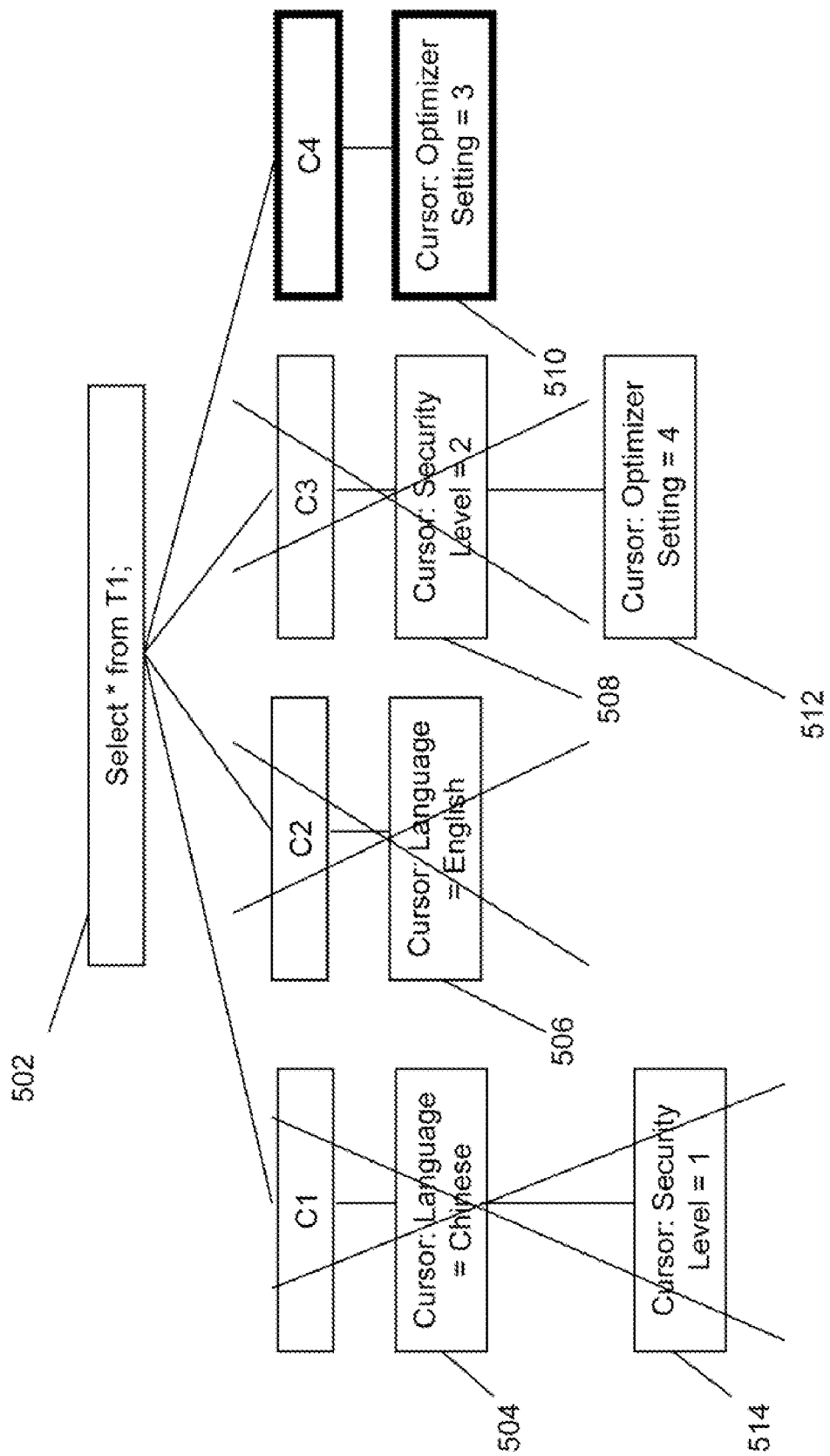

There are no further candidate child cursors that can be re-used for the execution of the query for User 4. Therefore, a new cursor C4 is created to execute the query for User 4, and a new child node for C4 is added to the cursor hierarchy as shown in FIG. 5S. A new object/data in the form of a sharing criteria node 510 is created to be associated with child node C4, where the sharing criteria node 510 identifies the reason for creating new node C4, i.e., because of the existence of a mis-match for the optimizer setting since the setting required for C4 is "3".

FIG. 5T shows the state of the cursor hierarchy after execution of the query for User 4, where the cursor hierarchy indicates that the cursor cache now includes four sharable child cursors C1, C2, C3, and C4. The sharing criteria nodes 504, 506, 508, 510, 512, and 514 provide information that can be used to quickly determine whether any new queries executions can utilize and re-use any of these cursors.

Therefore, what has been described in an improved approach to manage cursor sharing and to effectively and efficiently prune cursors that cannot be re-used.

System Architecture Overview

Figure 6:
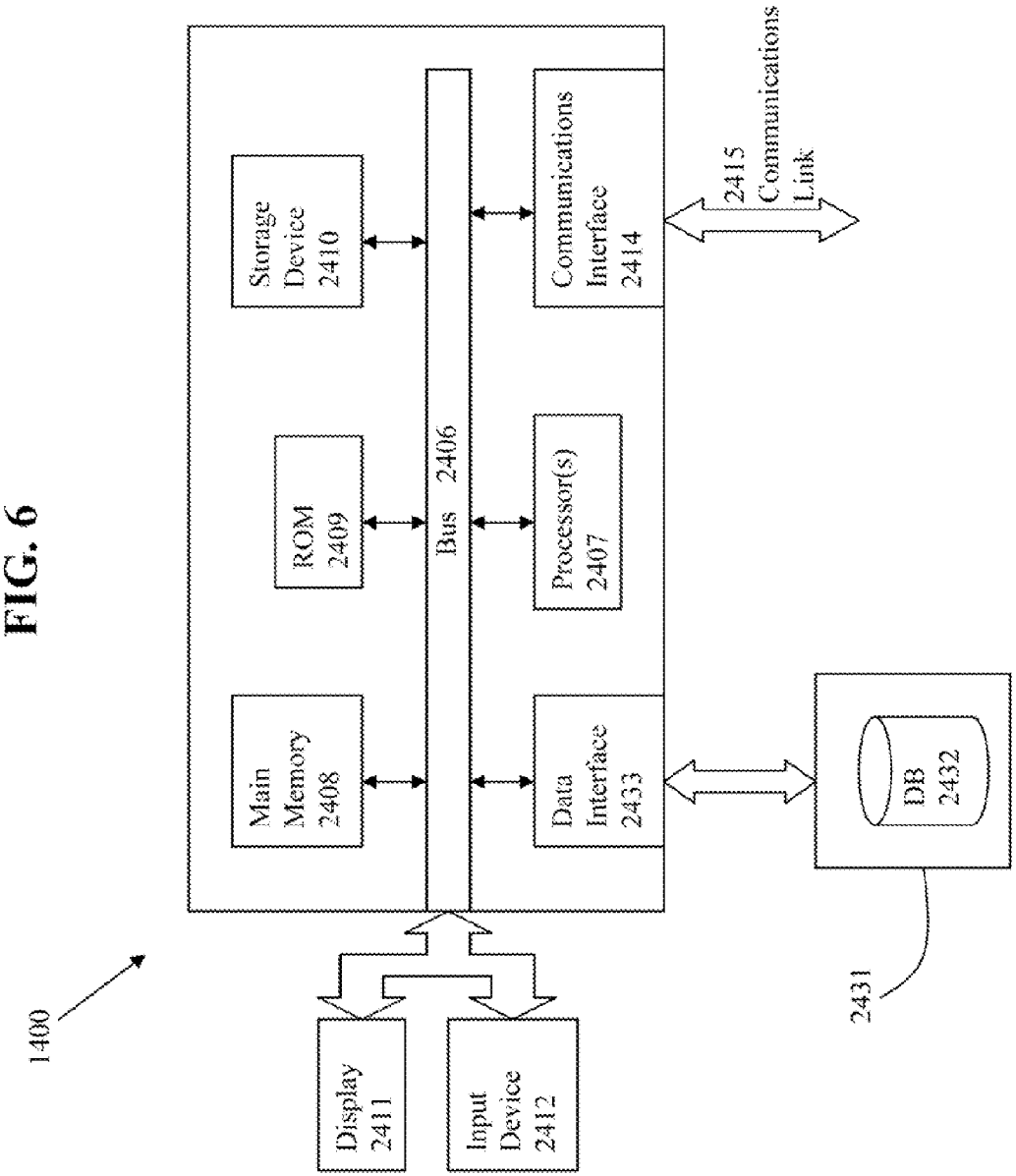
FIG. 6 depicts a computerized system on which a method for re-using digital assertions in a mixed signal context can be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for managing cursors in a database system that is executable by a processor, comprising:
using at least one processor to perform a process, the process comprising:
creating a structure to track sharable cursors in the database system, wherein
the structure includes a diagnostic node associated with a pre-existing child cursor; and
updating the diagnostic node to include information regarding why the pre-existing child cursor is not sharable for executing a query or why a child cursor was created instead of re-using the pre-existing child cursor to execute the query based at least in part upon a determination that the pre-existing child cursor is not to be shared for executing the query.

2. The method of claim 1 in which the diagnostic node identifies a sharing criterion that does not match with another child node.

3. The method of claim 2 in which multiple diagnostic nodes are associated with the child node, and wherein each diagnostic node corresponds to a different sharing criterion.

4. The method of claim 2 in which the sharing criterion corresponds to a system setting, optimizer setting, personal setting, or mapping setting.

5. The method of claim 1 in which a new child node is created if the pre-exiting child cursor cannot be shared for a new execution of a query, wherein the new child node is associated with a new diagnostic node for the new child node.

6. The method of claim 1 in which the child node is associated with a parent node for a query, and the parent node tracks the number of child cursors for the query.

7. The method of claim 1 in which the number of child nodes for a query corresponds to a selectivity for sharing criteria.

8. The method of claim 1 in which a candidate child cursor search list is created to search for a suitable candidate for re-using the child cursor.

9. The method of claim 8 in which the candidate child cursor list is sorted in descending order of selectivity.

10. The computer implemented method of claim 1, in which the act of determining whether to prune the child cursor from the sharable cursors is performed by the at least one processor based only upon a compatibility determination between the information in the diagnostic node associated with the child cursor and the database query without considering one or more sharing criteria for the child cursor.

11. The computer implemented method of claim 1, the process further comprising:
identifying or determining a threshold for a total number of diagnostic nodes in the database system; and
determining an order for the total number of nodes based at least in part upon a selectivity of a sharing criterion associated with each of the total number of diagnostic nodes.

12. The computer implemented method of claim 11, the process further comprising:
searching at least some of the total number of diagnostic nodes based at least in part upon the order for the total number of nodes.

13. A computer implemented method for managing cursors in a database system, comprising:
using at least one processor to perform a process, the process comprising:
accessing a structure which is used to track sharable cursors in the database system, wherein
the structure includes a diagnostic node associated with a child cursor;
analyzing the structure to determine whether the child cursor can be re-used to execute a query, wherein the diagnostic node is checked against a sharing criteria for executing the query to identify any mis-matches for the sharing criteria;

re-using the child cursor where the mis-matches are not identified; and creating a new child cursor if the mis-matches are identified and updating the diagnostic node to include information regarding why the child cursor is not sharable for executing the query or why the new child cursor is created instead of re-using the child cursor to execute the query based at least in part upon a determination that the child cursor is not to be shared for executing the query.

14. The method of claim 13 in which the diagnostic node identifies a sharing criterion that does not match with another child node.

15. The method of claim 14 in which multiple diagnostic nodes are associated with the child node, and wherein each diagnostic node corresponds to a different sharing criterion.

16. The method of claim 14 in which the sharing criterion corresponds to a system setting, optimizer setting, personal setting, or mapping setting.

17. The method of claim 13 in which a new child node is created if the pre-exiting child cursor cannot be shared for a new execution of a query, wherein the new child node is associated with a new diagnostic node for the new child node.

18. The method of claim 13 in which the child node is associated with a parent node for a query, and the parent node tracks the number of child cursors for the query.

19. The method of claim 13 in which the number of child nodes for a query corresponds to a selectivity for sharing criteria.

20. The method of claim 13 in which a candidate child cursor search list is created to search for a suitable candidate for re-using the child cursor.

21. The method of claim 20 in which the candidate child cursor list is sorted in descending order of selectivity.

22. A computer program product embodied on a non-transitory computer usable medium, the non-transitory computer readable medium having stored thereon a sequence of instructions which, when executed by a processor causes the processor to execute a method for managing cursors in a database system, the method comprising:

creating a structure to track sharable cursors in the database system, wherein
the structure includes a diagnostic node associated with a pre-existing child cursor; and
updating the diagnostic node to include information regarding why the pre-existing child cursor is not sharable for executing a query or why a child cursor was created instead of re-using the pre-existing child cursor to execute the query based at least in part upon a determination that the pre-existing child cursor is not to be shared for executing the query.

23. The computer program product of claim 22, in which the act of determining whether to prune the child cursor from the sharable cursors is performed by the at least one processor based only upon a compatibility determination between the information in the diagnostic node associated with the child cursor and the database query without considering one or more sharing criteria for the child cursor.

24. The computer program product of claim 22, the method further comprising:

identifying or determining a threshold for a total number of diagnostic nodes in the database system; and determining an order for the total number of nodes based at least in part upon a selectivity of a sharing criterion associated with each of the total number of diagnostic nodes.

25. The computer program product of claim 24, the method further comprising:

searching at least some of the total number of diagnostic nodes based at least in part upon the order for the total number of nodes.

26. A computer program product embodied on a non-transitory computer usable medium, the non-transitory computer readable medium having stored thereon a sequence of instructions which, when executed by a processor causes the processor to execute a method for managing cursors in a database system, the method comprising:

accessing a structure which is used to track sharable cursors in the database system,
wherein
the structure includes a diagnostic node associated with a child cursor;
analyzing the structure to determine whether the child cursor can be re-used to execute a query, wherein the diagnostic node is checked against a sharing criteria for executing the query to identify any mis-matches for the sharing criteria;
re-using the child cursor where the mis-matches are not identified; and
creating a new child cursor if the mis-matches are identified and updating the diagnostic node to include information regarding why the child cursor is not sharable for executing the query or why the new child cursor is created instead of re-using the child cursor to execute the query based at least in part upon a determination that the child cursor is not to be shared for executing the query.

27. The computer program product of claim 26, in which the act of pruning the child cursor is performed by the processor based only upon a compatibility determination between the information in the diagnostic node associated with the child cursor and the database query without considering one or more sharing criteria for the child cursor.

28. The computer program product of claim 26, the method further comprising:

identifying or determining a threshold for a total number of diagnostic nodes in the database system; and determining an order for the total number of nodes based at least in part upon a selectivity of a sharing criterion associated with each of the total number of diagnostic nodes.

29. The computer program product of claim 28, the method further comprising:

searching at least some of the total number of diagnostic nodes based at least in part upon the order for the total number of nodes.

30. A computer-based system for managing cursors in a database system, comprising:

a computer processor to execute a set of program code instructions;

a non-transitory memory to hold the program code instructions, in which the program code instructions, when executed by the computer processor, cause the computer processor to:
create a structure to track sharable cursors in the database system, wherein
the structure includes a diagnostic node associated with a pre-existing child cursor, and
update the diagnostic node to include information regarding why the pre-existing child cursor is not sharable for executing a query or why a child cursor was created instead of re-using the pre-existing child cursor to execute the query based at least in part upon a determination that the pre-existing child cursor is not to be shared for executing the query.

31. The computer system of claim 30, in which the computer processor is to determine whether to prune the child cursor from the sharable cursors based only upon a compatibility determination between the information in the diagnostic node associated with the child cursor and the database query without considering one or more sharing criteria for the child cursor.

32. The computer system of claim 30, in which the computer processor is further to:
identify or determine a threshold for a total number of diagnostic nodes in the database system; and
determine an order for the total number of nodes based at least in part upon a selectivity of a sharing criterion associated with each of the total number of diagnostic nodes.

33. The computer system of claim 32, the computer processor is further to:
search at least some of the total number of diagnostic nodes based at least in part upon the order for the total number of nodes.

34. The computer program product of claim 26, the method further comprising:
determining whether to prune the child cursor from the sharable cursors based only upon a compatibility determination between the information in the diagnostic node associated with the child cursor and the database query without considering one or more sharing criteria for the child cursor.

35. The computer program product of claim 26, the method further comprising:
identifying or determining a threshold for a total number of diagnostic nodes in the database system; and
determining an order for the total number of nodes based at least in part upon a selectivity of a sharing criterion associated with each of the total number of diagnostic nodes.

36. The computer program product of claim 35,
the method further comprising:
searching at least some of the total number of diagnostic nodes based at least in part upon the order for the total number of nodes.

37. A computer-based system for managing cursors in a database system, comprising:
a computer processor to execute a set of program code instructions;
a memory to hold the program code instructions, in which the program code instructions comprise instructions which, when executed by the computer processor, causes the computer processor to:
access a structure which is used to track sharable cursors in the database system, wherein
the structure includes a diagnostic node associated with a child cursor, and
the diagnostic node comprises information regarding why the child cursor is not sharable or why the child cursor was created instead of re-using a pre-exiting child cursor; and
analyze the structure to determine whether the child cursor can be re-used to execute a query, wherein
the diagnostic node is checked against a sharing criteria for executing the query to identify any mis-matches for the sharing criteria;
re-use the child cursor if the mis-matches are not identified; and
create a new child cursor if the mis-matches are identified and update the diagnostic node to include information regarding why the child cursor is not sharable for executing the query or why the new child cursor is created instead of re-using the child cursor to execute the query based at least in part upon a determination that the child cursor is not to be shared for executing the query.

* * * * *